United States Patent
Miyoshi

(10) Patent No.: US 6,469,960 B1
(45) Date of Patent: Oct. 22, 2002

(54) MAGNETO-OPTICAL STORAGE APPARATUS CAPABLE OF ADJUSTING THE MAGNETIC FIELD STRENGTH

(75) Inventor: Yasuo Miyoshi, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/541,884

(22) Filed: Mar. 31, 2000

(30) Foreign Application Priority Data

Aug. 26, 1999 (JP) .......................................... 11-240501

(51) Int. Cl.[7] .............................................. G11B 11/00
(52) U.S. Cl. ................................ 369/13.14; 369/13.05; 369/13.27
(58) Field of Search ............................ 369/13, 14, 116, 369/13.14, 13.15, 13.16, 13.05, 13.27, 13.26, 47.53, 53.2; 360/59, 114; 365/122

(56) References Cited

U.S. PATENT DOCUMENTS

| 5,398,227 A | * | 3/1995 | Miyaoka et al. ............ 369/116 |
| 5,587,975 A | * | 12/1996 | Kobayashi .................... 369/13 |
| 5,623,472 A | * | 4/1997 | Bakx et al. ................. 369/116 |
| 6,125,085 A | * | 9/2000 | Fuji et al. .................... 369/13 |
| 6,249,490 B1 | * | 6/2001 | Miyaoka ....................... 369/13 |
| 6,301,199 B1 | * | 10/2001 | Yamaguchi et al. .......... 369/13 |
| 6,324,128 B1 | | 11/2001 | Ikeda et al. .................... 369/13 |
| 6,388,955 B1 | * | 5/2002 | Takagi et al. ............ 369/13.09 |

FOREIGN PATENT DOCUMENTS

| JP | 5073948 | 3/1993 |
| JP | 8036843 | 2/1996 |
| JP | 10003706 | 1/1998 |
| JP | 10105972 | 4/1998 |
| JP | 11-232681 | 8/1999 |

* cited by examiner

Primary Examiner—Tan Dinh
(74) Attorney, Agent, or Firm—Greer, Burns & Crain, Ltd.

(57) ABSTRACT

In an information storage apparatus for recording information in a recording medium by applying an external magnetic field to a position illuminated by the light beam, an external magnetic field control part controls an external magnetic field strength based on the illuminated position on the recording medium.

11 Claims, 37 Drawing Sheets

| OPTIMUM OFFSET | | | | | |
|---|---|---|---|---|---|
| SECTOR | #0 | #1 | #2 | ... | #(n-1) |
| POWER OFFSET | $\Delta p_0$ | $\Delta p_1$ | $\Delta p_2$ | ... | $\Delta p_{(n-1)}$ |

F I G. 14

| SECTOR | #0 | #1 | #2 | ... | #(n-1) |
|---|---|---|---|---|---|
| EXTERNAL MAGNETIC FIELD STRENGTH OFFSET | $\Delta m_0$ | $\Delta m_1$ | $\Delta m_2$ | ... | $\Delta m_{(n-1)}$ |

OPTIMUM OFFSET

14c

F I G. 1 6

14d

LD POWER ERROR RATE TABLE

| LD POWER OFFSET | # 0 | # 1 | # 2 | ... | # (n-1) |
|---|---|---|---|---|---|
| $-(i*k)$ | $e_{(-i),0}$ | $e_{(-i),1}$ | $e_{(-i),2}$ | ... | $e_{(-i),(n-1)}$ |
| $-((i-1)*k)$ | $e_{(-(i-1)),0}$ | $e_{(-(i-1)),1}$ | $e_{(-(i-1)),2}$ | | $e_{(-(i-1)),(n-1)}$ |
| ... | ... | ... | ... | | |
| 0 | $e_{0,0}$ | $e_{0,1}$ | $e_{0,2}$ | | $e_{0,(n-1)}$ |
| ... | ... | ... | ... | | ... |
| $-((i-1)*k)$ | $e_{(i+1),0}$ | $e_{(i+1),1}$ | $e_{(i+1),2}$ | | $e_{(i+1),(n-1)}$ |
| $(i*k)$ | $e_{i,0}$ | $e_{i,1}$ | $e_{i,2}$ | | $e_{i,(n-1)}$ |

FIG. 18

EXTERNAL MAGNETIC FIELD ERROR RATE TABLE

14e

| OFFSET | # 0 | # 1 | # 2 | ... | # (n-1) |
|---|---|---|---|---|---|
| -(i*k) | $em_{(-i),0}$ | $em_{(-i),1}$ | $em_{(-i),2}$ | | $em_{(-i),(n-1)}$ |
| -((i-1)*k) | $em_{(-(i-1)),0}$ | $em_{(-(i-1)),1}$ | $em_{(-(i-1)),2}$ | | $em_{(-(i-1)),(n-1)}$ |
| ... | ... | ... | ... | | |
| 0 | $em_{0,0}$ | $em_{0,1}$ | $em_{0,2}$ | | $em_{0,(n-1)}$ |
| ... | ... | ... | ... | | |
| -((i-1)*k) | $em_{(i+1),0}$ | $em_{(i+1),1}$ | $em_{(i+1),2}$ | | $em_{(i+1),(n-1)}$ |
| (i*k) | $em_{i,0}$ | $em_{i,1}$ | $em_{i,2}$ | | $em_{i,(n-1)}$ |

| OPTIMUM OFFSET | #0 | #1 | #2 | ... | #(n-1) |
|---|---|---|---|---|---|
| Z0 | $\Delta p_{0,0}$ | $\Delta p_{1,0}$ | $\Delta p_{2,0}$ | ... | $\Delta p_{(n-1),0}$ |
| Z1 | $\Delta p_{0,1}$ | $\Delta p_{1,1}$ | $\Delta p_{2,1}$ | ... | $\Delta p_{(n-1),1}$ |
| . | | | | . | |
| . | | | | . | |
| . | | | | . | |
| . | | | | . | |
| . | | | | . | |
| Z(m-1) | $\Delta p_{0,(m-1)}$ | $\Delta p_{1,(m-1)}$ | $\Delta p_{2,(m-1)}$ | ... | $\Delta p_{(n-1),(m-1)}$ |
| | A0 | A1 | A2 | | A(n-1) |

| OPTIMUM OFFSET | #0 | #1 | #2 | ... | #(n-1) | |
|---|---|---|---|---|---|---|
| Z0 | $\Delta m_{0,0}$ | $\Delta m_{1,0}$ | $\Delta m_{2,0}$ | ... | $\#(n-1)$ | |
| Z1 | $\Delta m_{0,1}$ | $\Delta m_{1,1}$ | $\Delta m_{2,1}$ | ... | $\Delta m_{(n-1),0}$ | |
| . | | | | . | $\Delta m_{(n-1),1}$ | |
| . | | | | . | | |
| . | | | | . | | |
| . | | | | . | | |
| . | | | | . | | |
| Z(m-1) | $\Delta m_{0,(m-1)}$ | $\Delta m_{1,(m-1)}$ | $\Delta m_{2,(m-1)}$ | ... | $\Delta m_{(n-1),(m-1)}$ | |
| | A0 | A1 | A2 | | A(n-1) | |

F I G. 3 2
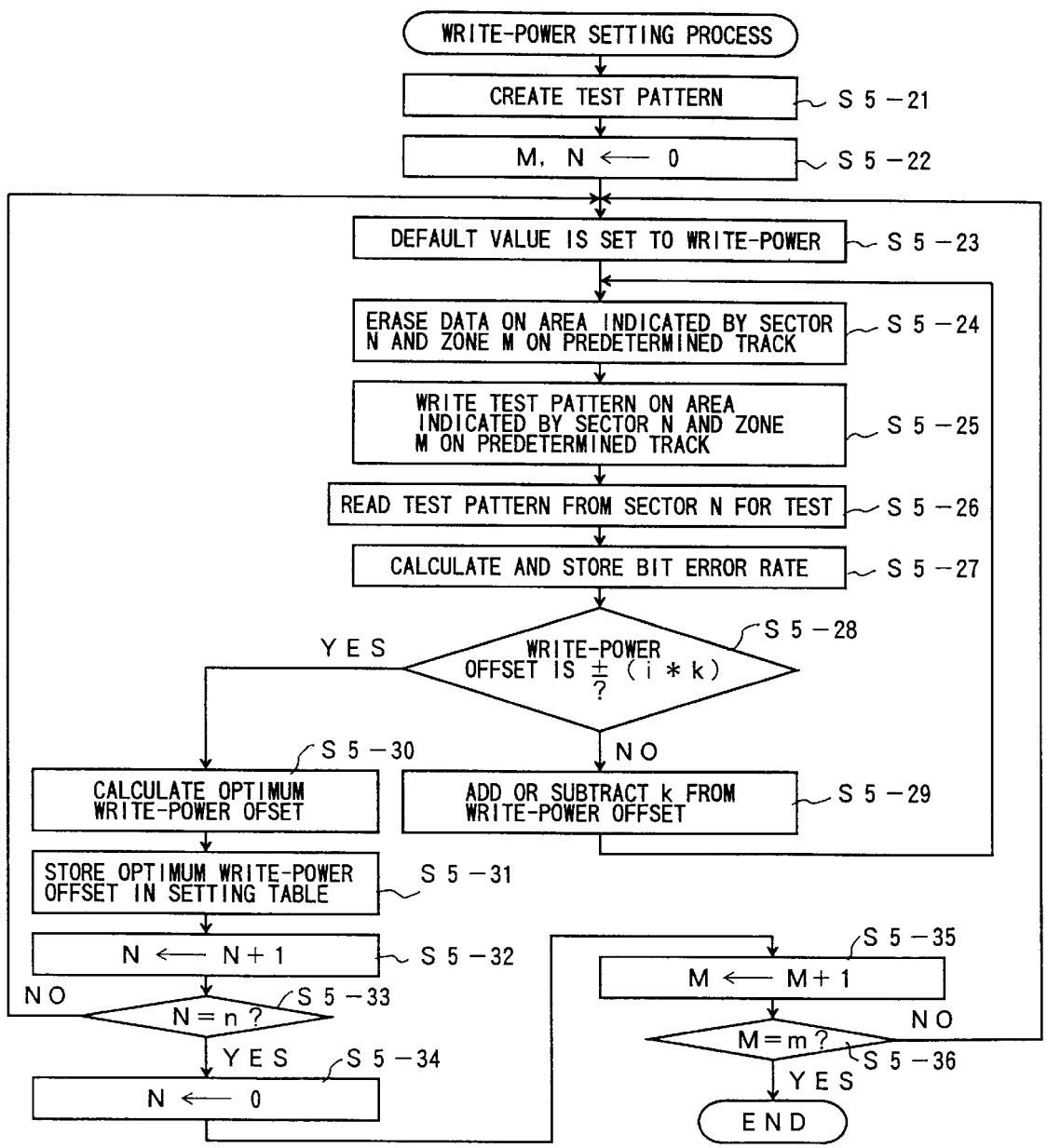

FIG. 36

OPTIMUM OFFSET

| BLOCK | B1 | B2 | B3 | ... | Bn |
|---|---|---|---|---|---|
| POWER OFFSET | $\Delta p_0$ | $\Delta p_1$ | $\Delta p_2$ | ... | $\Delta p_{(n-1)}$ |

14a

MAGNETO-OPTICAL STORAGE APPARATUS CAPABLE OF ADJUSTING THE MAGNETIC FIELD STRENGTH

BACKGROUND OF THE INVENTION

1. Field of the Invention

The present invention generally relates to information storage apparatuses, and more particularly to an information storage apparatus which stores information by emitting a laser beam on a recording medium while a magnetic field is being applied.

Recently, optical discs have become a subject of attention as multimedia is being developed rapidly. It is desired for the optical discs to have an increasingly larger amount of storage. For example, a 3.5-inch MO has increased to a maximum of 1.3 GB. In order to achieve the large amount of storage, it is required to minimize a laser beam spot, to improve the accuracy of a focus servo, and to control the laser power accurately.

2. Description of the Related Art

In general, in a storage apparatus for use with a replaceable recording medium, the replaceable recording medium is mechanically displaced to a spindle motor when the replaceable recording medium is inserted and a medium supporting part has a mechanical tolerance. Moreover, the disk surface of the recording medium is physically uneven and distorted.

Thus, the recording medium is tilted at an angle to an optical head. Disadvantages known as tilt and skew occur.

FIG. 1 is a diagram showing a state of reading from a recording medium. FIG. 2 is a graph showing one distance between an optical head and the recording medium and another distance between an electromagnet and the recording medium, in correspondence with a rotation degree of the recording medium.

In FIG. 1, the surface of the recording medium 102 is not perpendicular but is tilted with respect to a spindle shaft 101 of a spindle motor 100.

In this state, when the recording medium 102 is rotated by the spindle motor 100 and a beam spot 105 from the optical head 103 scans on a track 104, a distance between the optical head 103 and the surface of the recording medium 102 is depicted by a sine curve with solid line shown in FIG. 2 in correspondence with the rotation degree.

On the other hand, the electromagnet 106 and the optical head 103 face each other and the recording medium 102 is provided between the electromagnet 106 and the optical head 103. Thus, a distance between the electromagnet 106 and the surface of the recording medium 102 is depicted by a cosine curve with dotted line in correspondence with the rotation degree.

Further, FIG. 3 is a diagram showing another state of reading from a recording medium. FIG. 4 is a graph showing a characteristic of a tilt of the recording medium with respect to the optical head in the state shown in FIG. 3. FIG. 5 is a graph showing a distance between the recording medium and the electromagnet in the state shown in FIG. 3.

FIG. 3 shows a state in which a recording medium 110 is a distorted plate. In this state, when the optical head 103 moves in an arrow A2 direction, that is, from the inner side to the outer side, a vertical distance between the optical head 103 and the surface of the recording medium decreases as shown in FIG. 4. Also, as shown in FIG. 5, the vertical distance between the electromagnet 106 and the surface of the recording medium 110 is greater on the outer side and less on the inner side.

Accordingly, in the state in FIG. 1 or FIG. 3, an incident beam emitted from the optical head can not be perpendicular with respect to the recording medium. Thus, the shape of the laser spot is distorted. Consequently, an expected laser power for reading or writing can not be achieved. In addition, an external magnetic field applied to the recording medium 110 is changed by a distance between the recording medium 110 and the electromagnet 106. Thus, an expected magnetic field strength can not be achieved.

In a case in which the expected laser power is not achieved, an unexpected laser power does not affect the quality of reading or writing when a recording density such as a track per inch (TPI) or a bit per inch (BPI) is low. However, when the recording density is high, an error rate is increased and can not be ignored.

Also, in a case in which the expected external magnetic field strength is not achieved, an unexpected magnetic field strength does not affect the quality of reading or writing when the recording density is low. However, when the recording density is high, the error rate is increased and can not be ignored.

Therefore, a method is provided to correct the tilt and skew of the recording medium 102 or 110 by adjusting a tilt of the spindle motor 100.

In the method in which the tilt and skew of the recording medium 102 or 110 is corrected by adjusting the spindle motor 100, it is required to provide a mechanism for controlling the inclination of the spindle motor 100 and a sufficient space for the mechanism. Disadvantageously, when the spindle motor 100 is mechanically adjusted, it is difficult to carry out the adjustment at a high rotation speed.

SUMMARY OF THE INVENTION

It is a general object of the present invention to provide an information storage apparatus in which the above-mentioned problems are eliminated.

A more specific object of the present invention is to provide an information storage apparatus in which a proper external magnetic field strength is obtained by controlling the external magnetic field strength, instead of adjusting a tilt of a recording medium, The above objects of the present invention are achieved by an information storage apparatus for emitting a light beam to a recording medium and recording information on the recording medium by applying an external magnetic field to a position illuminated by the light beam, including: an external magnetic field control part controlling an external magnetic field strength based on the illuminated position on the recording medium.

According to the present invention, the external magnetic field strength is controlled based on the illuminated position on the recording medium. Therefore, it is possible to properly read or write data from or to the recording medium even if the recording medium is distorted or tilted.

Also, the above objects of the present invention are achieved by a method for emitting a light beam to a recording medium and recording information on the recording medium by applying an external magnetic field to a position illuminated by the light beam, including the step of: controlling an external magnetic field strength based on the illuminated position on the recording medium.

According to the present invention, the method can be provided to properly read or write data from or to the recording medium even if the recording medium is distorted or tilted.

Other objects, features and advantages of the present invention will become more apparent from the following detailed description when read in conjunction with the accompanying drawings.

BRIEF DESCRIPTION OF THE DRAWINGS

FIG. 11 is a diagram showing a data structure of a read-power setting table of the laser beam according to the first embodiment of the present invention;

FIG. 14 is a diagram showing a data structure of an external magnetic field setting table according to the first embodiment of the present invention;

FIG. 16 is a diagram showing a data structure of an error rate table used in the variation of the read-power setting process according to the first embodiment of the present invention;

FIG. 18 is a diagram showing a data structure of an error rate table used in the variation of the external magnetic field strength setting process according to the first embodiment of the present invention;

FIG. 28 is a diagram showing a data structure of a read-power setting table according to the second embodiment of the present invention;

FIG. 30 is a diagram showing a data structure of an external magnetic field strength setting table according to the second embodiment of the present invention;

FIG. 32 is a flow chart for explaining a writing process according to the second embodiment of the present invention;

FIG. 36 is a diagram showing a data structure of the read-power setting table according to the third embodiment of the present invention.

DESCRIPTION OF THE PREFERRED EMBODIMENTS

Figure 1:
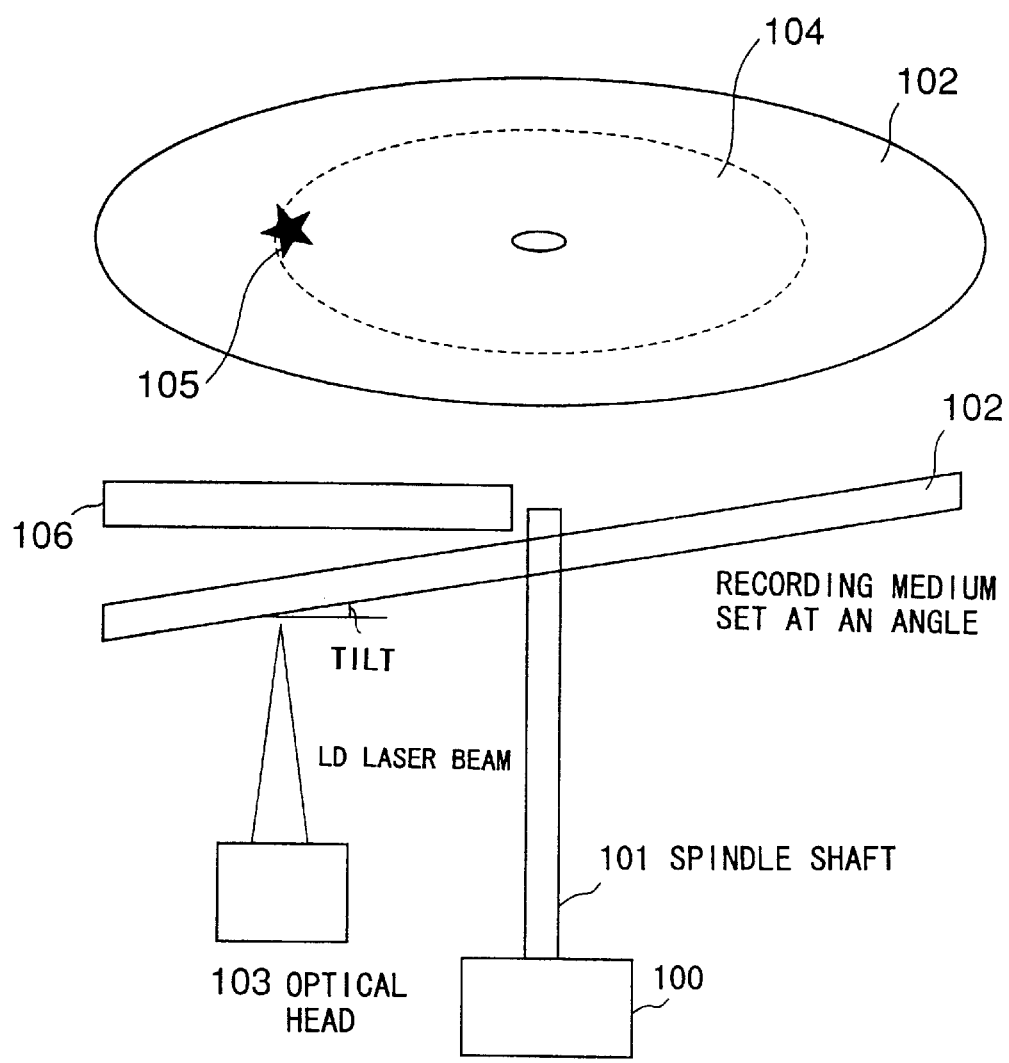
FIG. 1 is a diagram showing a state of reading from a recording medium.
Figure 2:
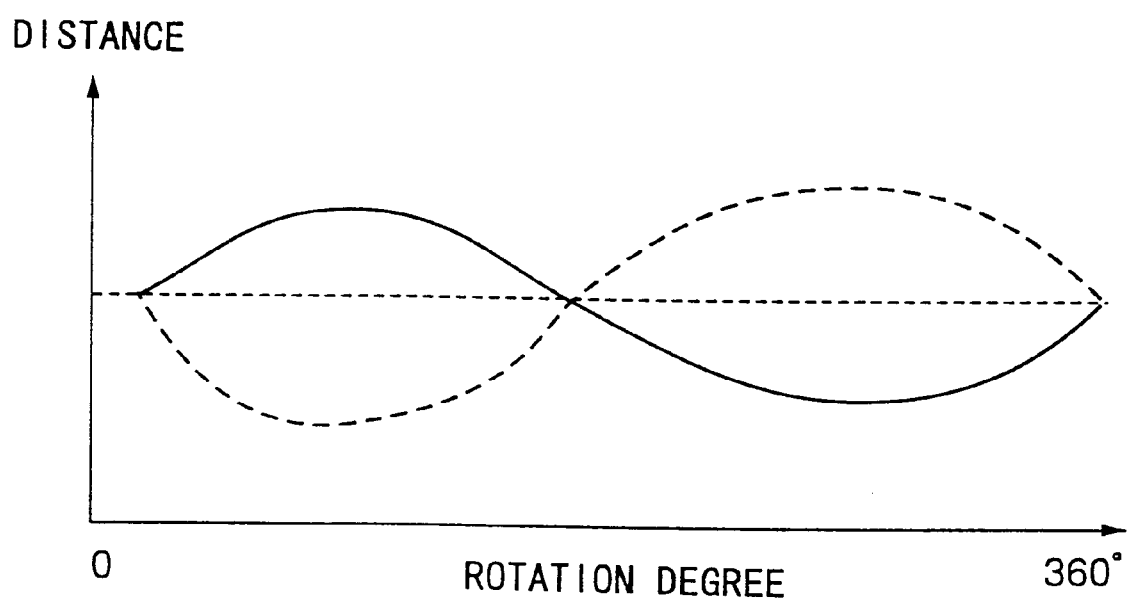
FIG. 2 is a graph showing one distance between an optical head and the recording medium and another distance between an electromagnet and the recording medium, in correspondence with a rotation degree of the recording medium.
Figure 3:
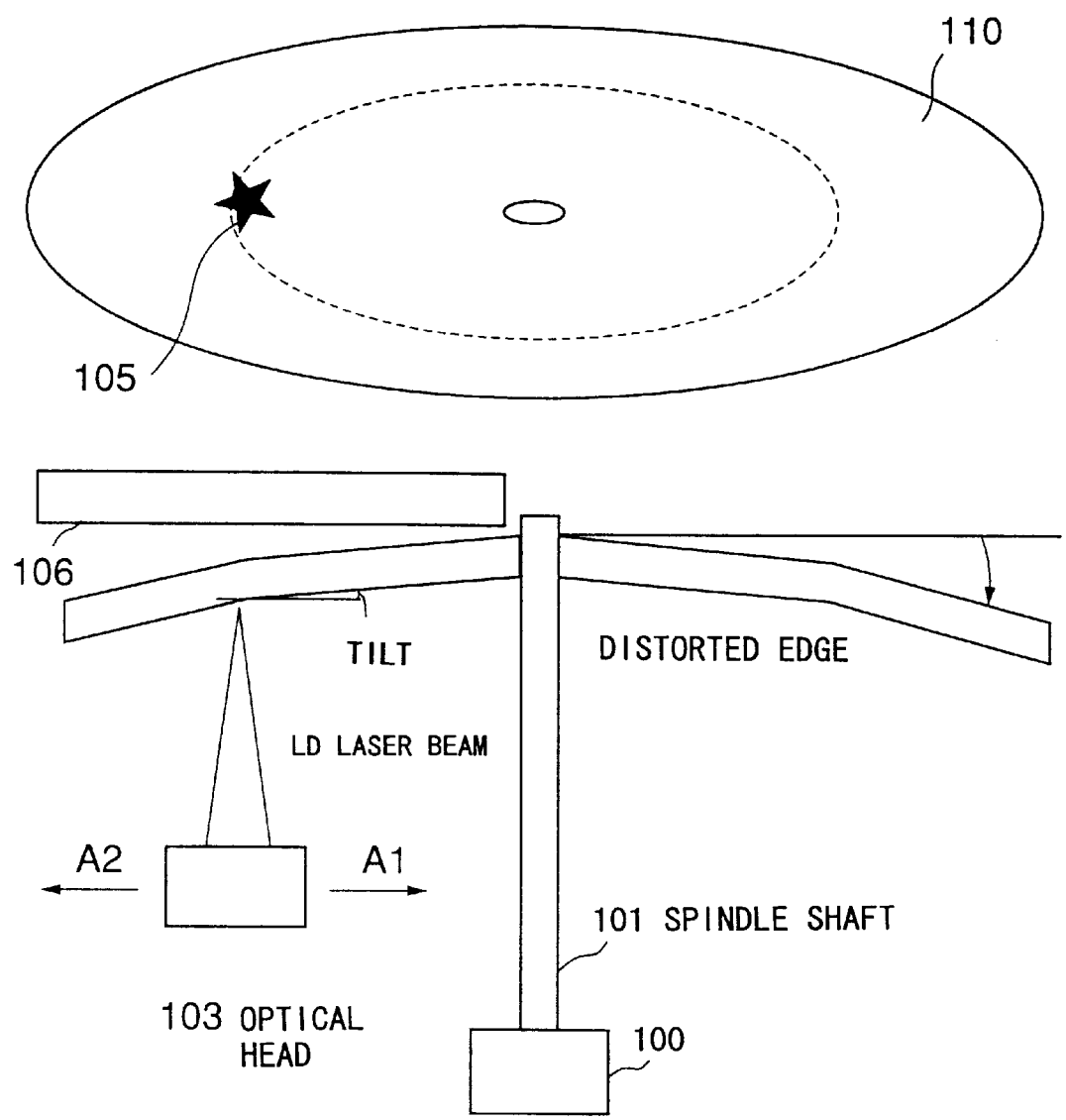
FIG. 3 is a diagram showing another state of reading from a recording medium.
Figure 4:
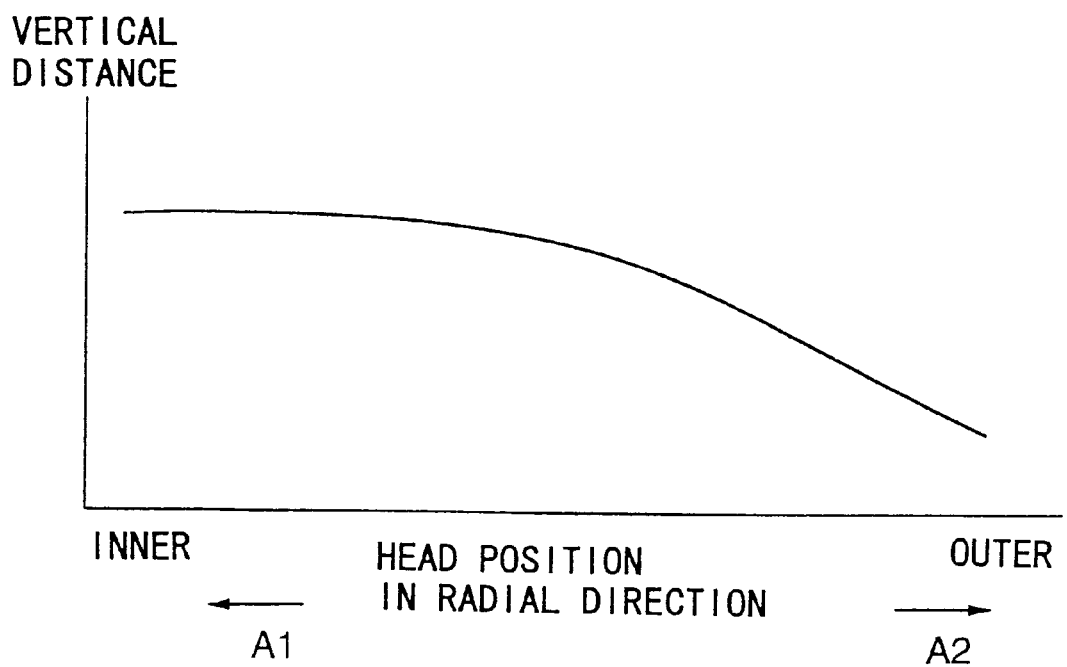
FIG. 4 is a graph showing a characteristic of a tilt of the recording medium with respect to the optical head in the state shown in FIG. 3.
Figure 5:
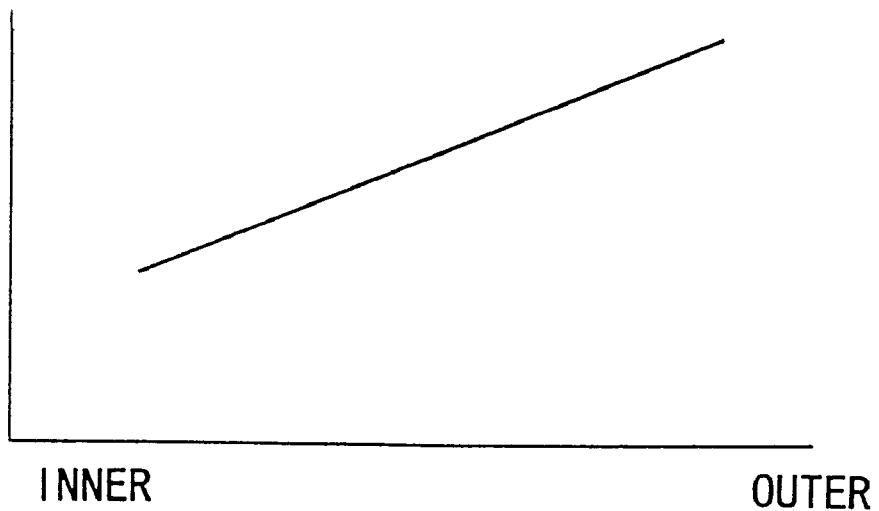
FIG. 5 is a graph showing a distance between the recording medium and the electromagnet in the state shown in FIG. 3.
Figure 6:
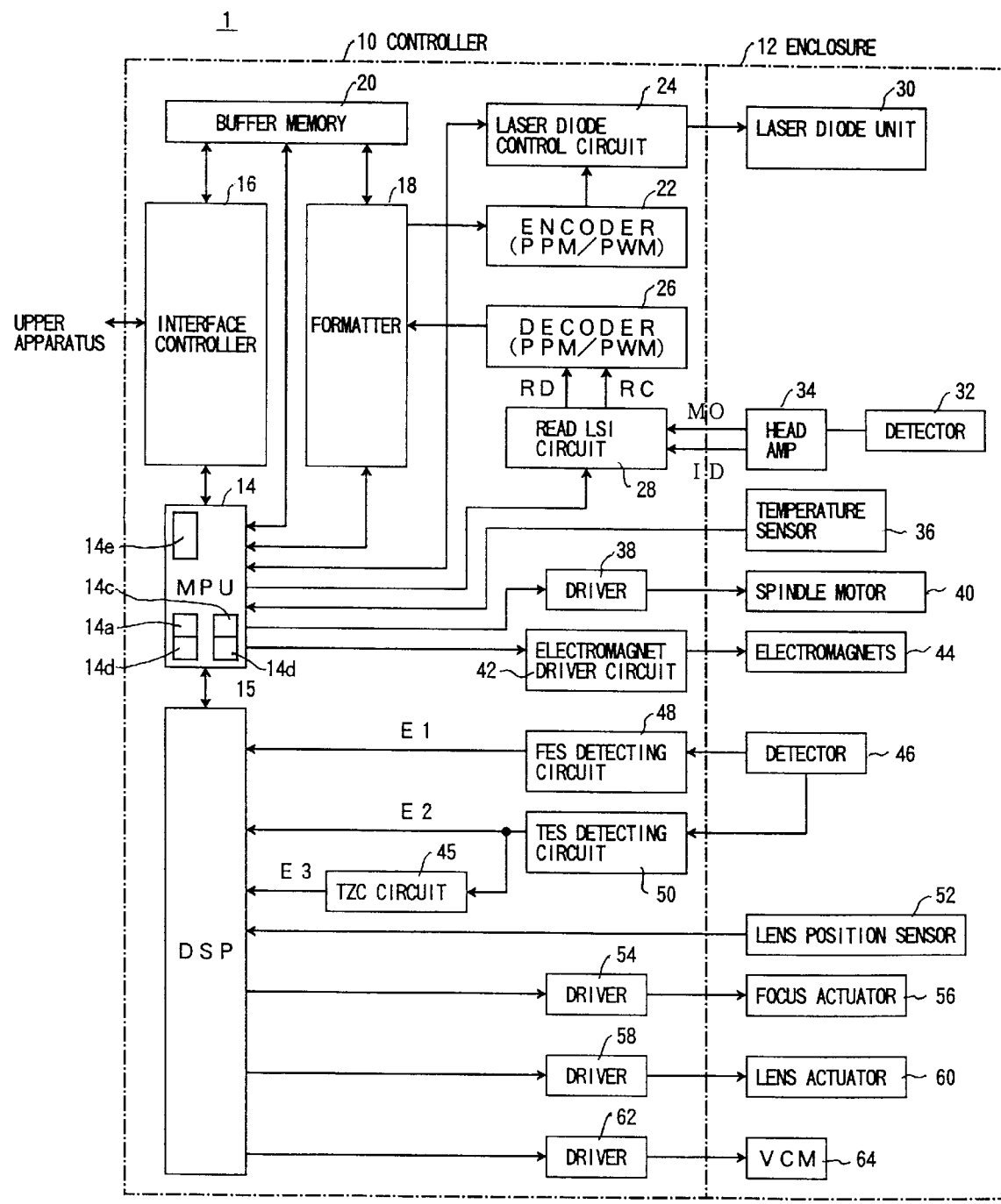
FIG. 6 is a block diagram showing a magneto optical disc drive according to a first embodiment of the present invention.

FIG. 6 is a block diagram showing a magneto optical disc drive according to a first embodiment of the present invention.

An optical disc drive 1 corresponding to an information storage apparatus according to the embodiment mainly includes a controller 10 and an enclosure 12. The controller 10 includes an MPU (Micro Processor Unit) 14 to control an entire optical disc drive 1, an interface controller 16 to process commands or data to/from an upper apparatus, a formatter 18 to process data to write or be read to/from an optical medium, an MPU 14 and a buffer memory 20 used in common by the interface controller 16 and the formatter 18.

A laser diode control circuit 24 is connected to the formatter 18 via an encoder 22 as a data write system. A control output of the laser diode control circuit 24 is supplied to a laser diode unit 30 provided in an optical unit of the enclosure side. The laser diode unit 30 includes a laser diode and a photodetector for a monitor.

The MPU 14 includes an internal memory including a read-power setting table 14a to control read-power for each sector, a write-power setting table 14b to control write-power for each sector, and an external magnetic field strength setting table 14c.

The MPU 14 is connected to and controls the laser diode control circuit 24 so that the read-power and the write-power are controlled based on the read-power setting table 14a and the write-power setting table 14b. In addition, the MPU 14 controls an external magnetic field strength by controlling an electromagnet driver circuit 42 based on the external magnetic field strength setting table 14c.

Furthermore, the formatter 18 is connected to the MPU 14. The MPU 14 recognizes a capacity of a inserted recording medium such as a 128 MB or 230 MB capacity, or a 540 MB or 640 MB capacity, or a 1.3 GB capacity and notifies the formatter 18 of the capacity.

Based on the recognition of the capacity of the recording medium, the MPU 14 determines to execute a format process corresponding to the PPM (Pit Position Modulation) recording method when the capacity is the 128 MB capacity or the 230 MB capacity or execute another format process corresponding to the PWM (Pulse Width Modulation) recording method when the capacity is the 540. MB or 640 MB capacity or the 1.3 GB capacity.

A decoder 26 connecting to a read LSI circuit 28 is connected to the formatter 18 as a data read system.

A reflected signal, of a laser beam reflected from a laser diode unit 30 by a detector 32 provided in the enclosure 12, is supplied to the read LSI circuit 28 via a head amplifier (AMP) 34. The reflected signal includes an ID signal and a MO signal. The read LSI circuit 28 includes an AGC (Automatic Gain Control) circuit, a filter, a sector mark detecting circuit, a synthesizer and a PLL (Phase-Locked Loop) circuit. In the read LSI circuit 28, a read clock and read-data are retrieved from the ID signal and the MO signal input by the head AMP 34 and supplied to the decoder 26.

The zoned CAV (Constant Angular Velocity) is applied as a recording method using spindle motor 40. The read LSI circuit 28 controlled by the MPU 14 controls the synthesizer to switch a clock frequency to correspond to a zone.

Based on the capacity indicated by the formatter 18, when the 128 MB capacity or the 230 MB capacity is indicated, a modulation for the PPM recording method is executed by the encoder 22 and a demodulation for the PPM recording method is executed by the decoder 26. When the 540 MB or 640 MB capacity or the 1.3 GB capacity is indicated, a modulation for the PWM recording method is executed by the encoder 22 and a demodulation for the PWM recording method is executed by the decoder 26.

A temperature sensor 36 provided in the enclosure 12 supplies a temperature detecting signal to the MPU 14. The MPU 14 controls the laser diode control circuit 24 based on an environmental temperature, which is detected by the temperature sensor 36 inside of the information storage apparatus and optimizes the power of each emission for reading, writing and erasing while controlling the electromagnet driver circuit 42 to optimize the external magnetic field strength.

Furthermore, the MPU 14 controls a spindle motor 40 provided in the enclosure 12 by the driver 38. Data stored in the MO cartridge is formatted by the zoned CAV format. The MPU 14 controls the spindle motor 40 to rotate at a constant speed, for example, at 3600 rpm.

In addition, the MPU 14 controls electromagnets 44 provided in the enclosure 12 via a driver 42. One electromagnet 44 is provided at a side of a surface, which is illuminated by a beam, of an MO cartridge loaded in the information storage apparatus and another electromagnet 44 is provided at a back side of the surface. These electromagnets 44 provide an external magnetic field to the recording medium when data is written, erased or read.

A DSP (Digital Signal Processor) 15 controls a servo function for positioning a beam emitted from the laser diode 30 to the recording medium. A focus error signal is supplied to the DSP 15 by an FES (Focus Error Signal) detecting circuit 48. Also, a tracking error signal is supplied to the DSP 15 by a TES (Track Error Signal) detecting circuit 50.

In an optical unit in the enclosure 12, a detector 46 is provided to receive a reflected beam from the recording medium. The detector 46 includes a plurality of divisions to obtain an identical signal level corresponding to a waveform of a reflected beam from the recording medium.

The FES detecting circuit 48 generates a focus error signal El based on outputs of a two-division detector 46 and inputs to the DSP 15.

Also, the TES detecting circuit 50 generates a tracking error signal E2 based on outputs of a two-division detector 46 and inputs to the DSP 15. The tracking error signal E2 is input to a TZC (Track Zero Cross) circuit 45. The TZC circuit 45 generates a track zero cross pulse E3 and inputs to the DSP 15.

Moreover, in the enclosure 12, a lens position sensor 52 is provided to detect a position of an object lens for focusing a laser beam on the recording medium and to generate a lens position signal E4. The lens position sensor 52 inputs the lens position signal E4 to the DSP 15. The DSP 15 controls drivers 54, 58 and 62 for a focus actuator 56, a lens actuator 60 and a voice coil motor (VCM) 64, respectively.

A configuration of the enclosure of the optical disk drive 1 will now be described.

Figure 7:
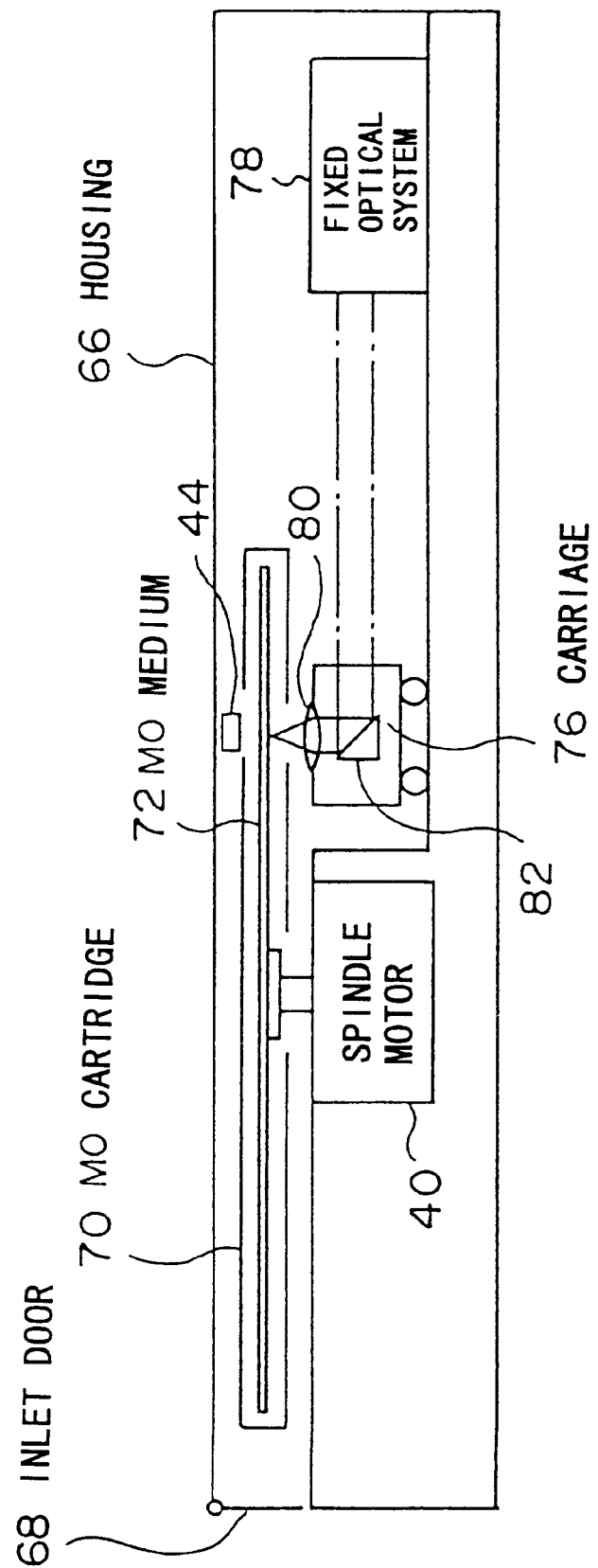
FIG. 7 is a schematic diagram showing the magneto optical disc drive.

FIG. 7 is a schematic diagram showing the magneto optical disc drive.

A spindle motor 40 is provided in a housing 66. A MO cartridge 70 is inserted through an inlet door 68 toward a hub of a rotation axis of the spindle motor 40. An internal MO medium 72 is mounted to the hub of the rotation axis of the spindle motor 40 after being loaded into the housing 66.

A carriage 76 is positioned under the loaded MO medium 72 of the MO cartridge 70. The carriage 76 is movable in a radial direction of the MO medium 72 controlled by the VCM 64. An object lens 80 is provided above the carriage 76. A laser beam emitted from a semiconductor laser device provided in a fixed optical system 78 passes through a prism 82 and is focused on the surface of the MO medium by the object lens 80.

The object lens 80 is controlled to move in an optical axis vertical direction by the focus actuator 56 in the enclosure 12 in FIG. 6 and controlled to focus. The object lens 80 is also controlled to move in the radial horizontal direction crossing the tracks of the medium 72, for example, within tens of tracks, by the lens actuator 60 and then tracking is controlled.

A position of the object lens 80 mounted on the carriage 76 is detected by the lens position sensor 52. A lens position detecting signal of the lens position sensor 52 shows '0' at a neutral position where the optical axis is properly positioned to focus. The lens position detecting signal outputs based on a displacement amount with a polarity showing an outer displacement or an inner displacement.

Figure 8:
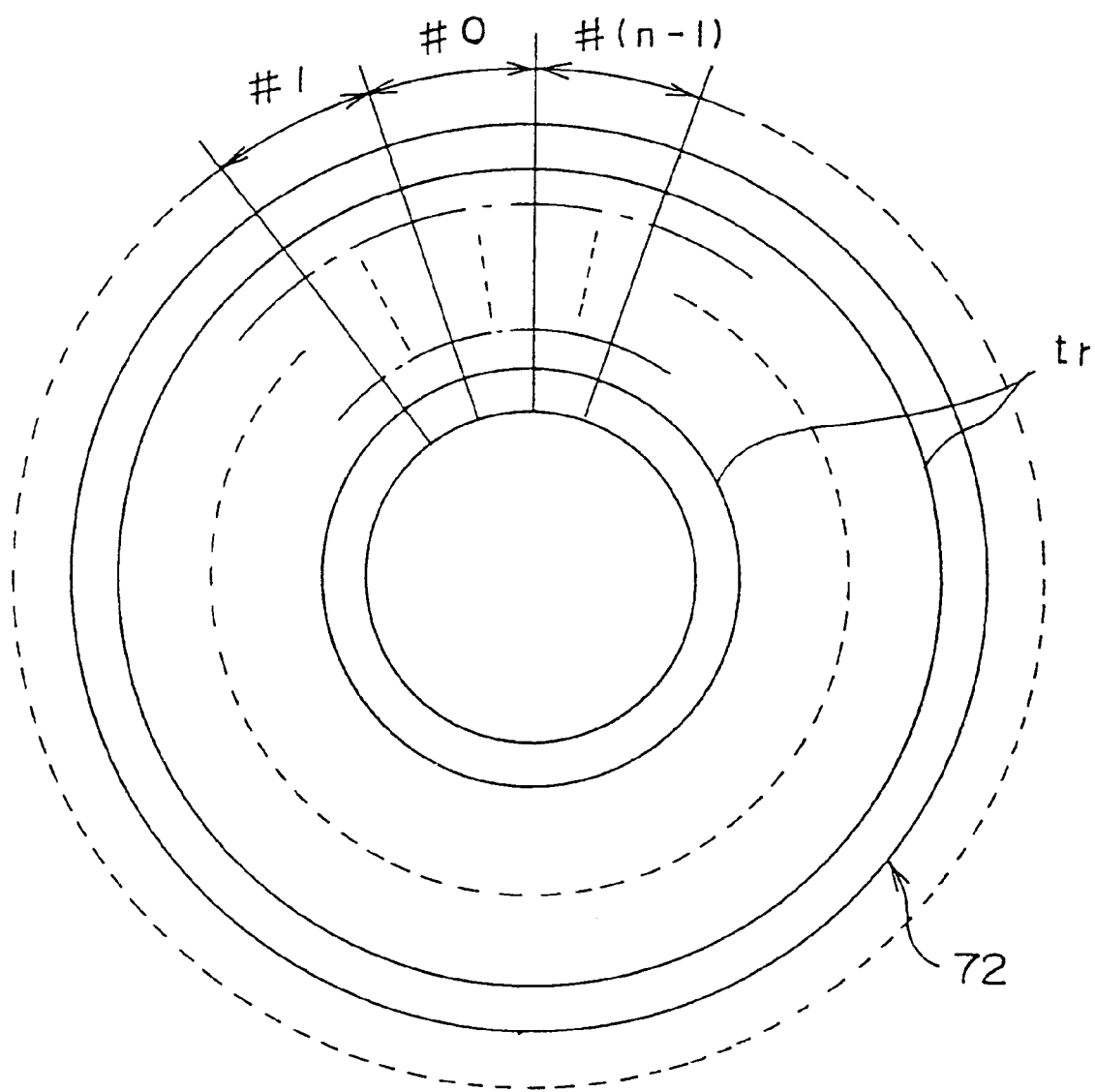
FIG. 8 is a diagram showing a formatted recording medium according to the first embodiment of the present invention.

FIG. 8 is a diagram showing a formatted recording medium according to the first embodiment of the present invention.

A recording medium is a disk-shaped or disk recording medium and a plurality of tracks tr are formed on concentric circles. One concentric circle on the recording medium is divided into sectors #0 through #(n−1). Servo signal marks (not shown) are equally spaced between sectors #0 through #(n−1) in order to trace a desired track tr. It should be noted that the servo signal marks are not provided within each of the sectors #0 through #(n−1).

A read-power setting process of the laser beam by the MPU 14 will now be described.

Figure 9:
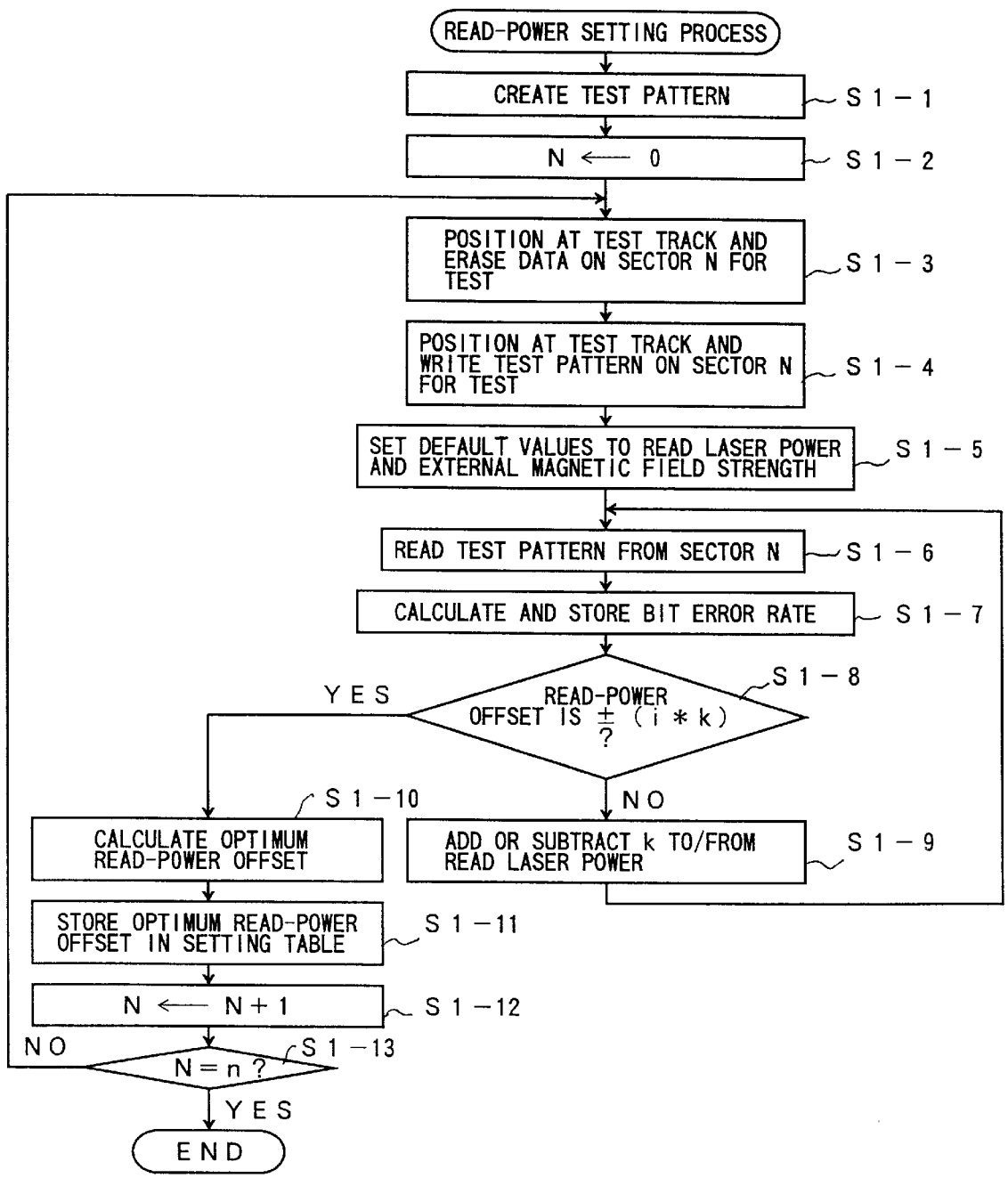
FIG. 9 is a flow chart for explaining a read-power setting process of a laser beam according to the first embodiment of the present invention.

FIG. 9 is a flow chart for explaining the read-power setting process of the laser beam according to the first embodiment of the present invention.

The MPU 14 executes the read-power setting process. An execution timing of the read-power setting process may be at a time when the recording medium is inserted or after a predetermined time passes, or when a first write or read command is supplied after the recording medium is inserted, or when retrying to process due to an error, or when temperature is changing.

In the read-power setting process of the laser beam, the MPU 14 creates and stores a test pattern in the buffer memory 20 (step S1-1).

Subsequently, a variable number N to identify a sector is set to '0' (step S1-2).

Moreover, the MPU 14 positions a laser spot at a test track provided at a predetermined area of the recording medium. The MPU 14 erases data on a sector N that is tested in the test track (step S1-3)

In the step S1-3, when the sector N for a test is erased, the test pattern stored in the buffer memory 20 in FIG. 6 in step S1-1 is written in the sector N to be tested (step S1-4). When the capacity is the 128 MB capacity or the 230 MB capacity, the PPM recording is executed. When the capacity is the 540 MB or 640 MB capacity, or the 1.3 GB In the step S1-4, the MPU 14 writes the test pattern in the sector N for a test and then sets a default value (corresponding to an initial value) for power of a laser spot (step S1-5). MPU 14 reads the test pattern from the sector N (step S1-6).

Next, the MPU 14 compares the test pattern read in the step S1-6 with the original test pattern that is created and stored in the buffer memory 20 in step S1-1. The MPU 14 calculates and stores a bit error rate in the internal memory of the MPU 14 (step S1-7). When bit0 denotes the total number of bits of the test pattern and bit1 denotes the number of bits where the test pattern read from the sector N does not match with the original test pattern, the bit error rate e is calculated as:

$$e = (\text{bit1})/(\text{bit0}) \quad (1)$$

When error byte number information of an ECC demodulating circuit is used and BYTE0 denotes the total number of bytes of the test pattern and BYTE1 denotes the number of bytes where the test pattern read from the sector N does not match with the original test pattern, the bit error rate e is calculated as:

$$e = (\text{BYTE1})/(\text{BYTE0}) \quad (2)$$

When the error rate e is calculated in the step S1-7, the MPU 14 sets +k as a read-power offset and sets laser power (p0+k), where k is added to a default value p0, as a read-power p of the laser spot. Then, the MPU 14 goes back to the step S1-6 and re-reads the test pattern stored in the predetermined sector N for a test (steps S1-8 and S1-9).

The above steps S1-6 through S1-9 are processed again. Consequently, the bit error rate $\{e0,N\}$, $\{e1,N\}$, ..., $\{e(i−1)),N\}$, $\{ei,N\}$, or $\{e(−1),N\}$, ..., $\{e(−(i−1)),N\}$, or $\{e(−i),N\}$ is obtained where the read-power p of the laser spot is (p0+k), (p0+2k), ..., (p0+(i−1)k), (p0+ik), or (p0−k), (p02k), ..., (p0−(i−1)k), or (p0−ik), respectively. Each bit error rate e is stored.

By repeating the above steps S1-6 through S1-9, a characteristic of the bit error rate e for the read-power p on the sector N is obtained.

It should be noted that the external magnetic field generated by the electromagnets 44 that is constant, for example, is controlled to be a default value for reading.

Figure 10:
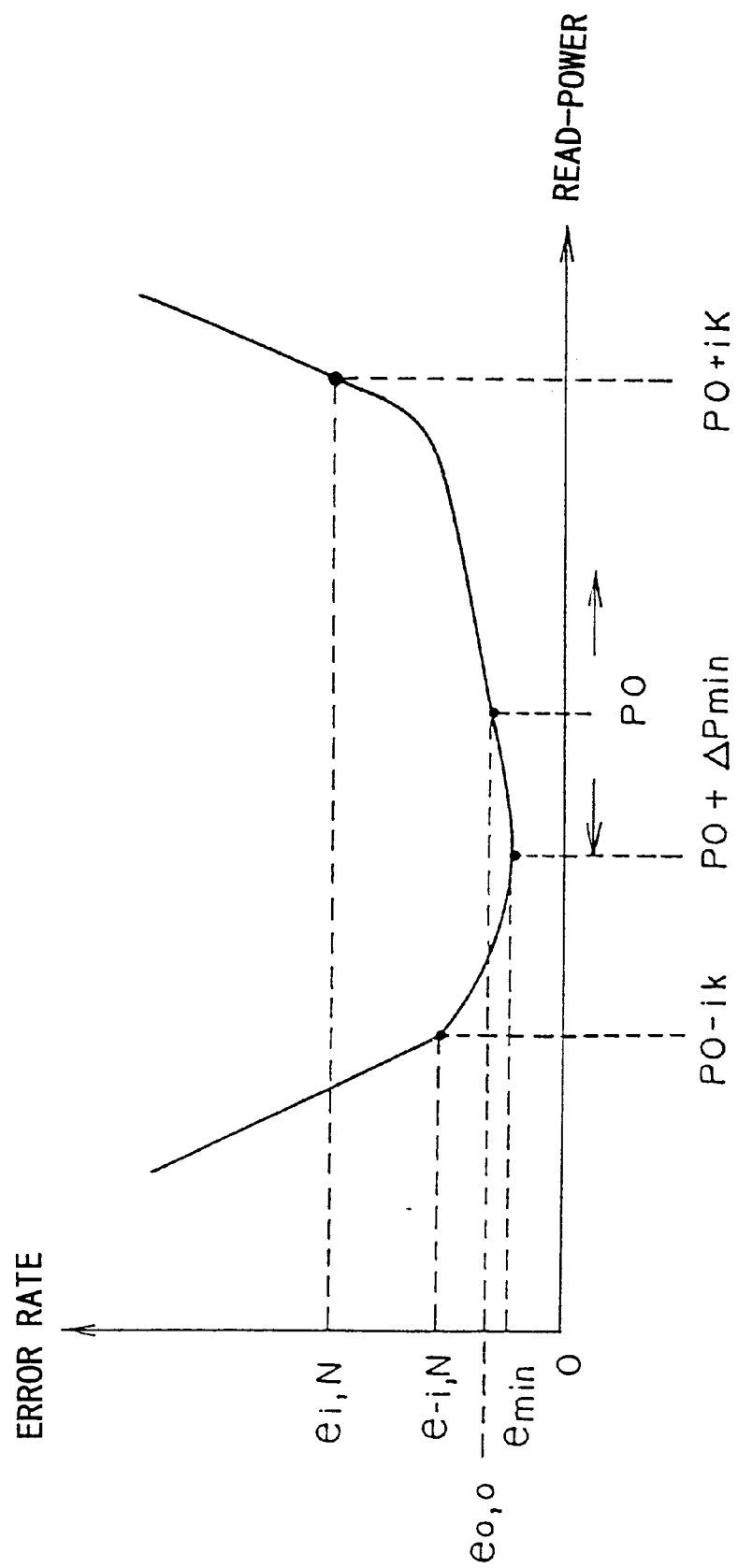
FIG. 10 is a graph showing a characteristic of a bit error rate for a read-power of the laser beam according to the first embodiment of the present invention.

FIG. 10 is a graph showing the characteristic of the bit error rate for the read-power of the laser beam according to the first embodiment of the present invention.

As shown in FIG. 10, the bit error rate changes from emin through $\{ei,N\}$ between the read-power of the laser beam (p0−ik) and (p0+ik) and the characteristic of an approximate U shape is obtained. In the characteristic in FIG. 9, the read-power (p0+Δpmin) at minimum error rate emin is an optimum read-power.

Thus, the MPU 14 selects the minimum error rate of the bit error rates obtained by the steps S1-6 through S1-9 and stores it. The MPU 14 stores the read-power offset Δpmin at the minimum error rate as a read-power for the sector N to the read-power setting table 14a (steps S1-10 and S1-11).

The MPU 14 increments a variable number N identifying a sector number by 1 and repeats the steps S1-3 through S1-11 until the variable number N reaches the sector number n provided on the recording medium. The MPU 14 obtains the optimum read-power offsets for all sectors #0 through #(n−1) provided on the recording medium and stores the offsets in the read-power setting table 14a (steps S1-12 and S1-13).

FIG. 11 is a diagram showing a data structure of the read-power setting table of the laser beam according to the first embodiment of the present invention.

The read-power setting table 14a is, for example, provided in the internal memory of the MPU 14. As shown in FIG. 10, when the read-power setting table 14a is divided into the n sectors #0 through #(n−1), the read-power offsets Δp0 through Δp(n−1) are set for sectors #0 through #(n−1), respectively.

By the read-power setting process shown in FIG. 9, the read-power offsets Δp0 through Δp(n−1) are set for the sector #0 through #(n−1), respectively.

When data is read from the recording medium, the read power is controlled based on the read-power offsets Δp0 through Δp(n−1) set in the read-power setting table 14a.

In the read-power setting process according to the present invention, a single measuring process of the error rate is executed for each read-power. But error rates resulting from executing the measuring process many times may be averaged. Thus, the error rate can be improved and then it is possible to control the read-power with high accuracy. In addition, using a plurality of test patterns for the measuring process of the error rate can improve the accuracy of the measuring the error rate. Thus, it is possible to control the read-power with high accuracy.

An external magnetic field strength setting process executed by the MPU 14 will now be described.

Figure 12:
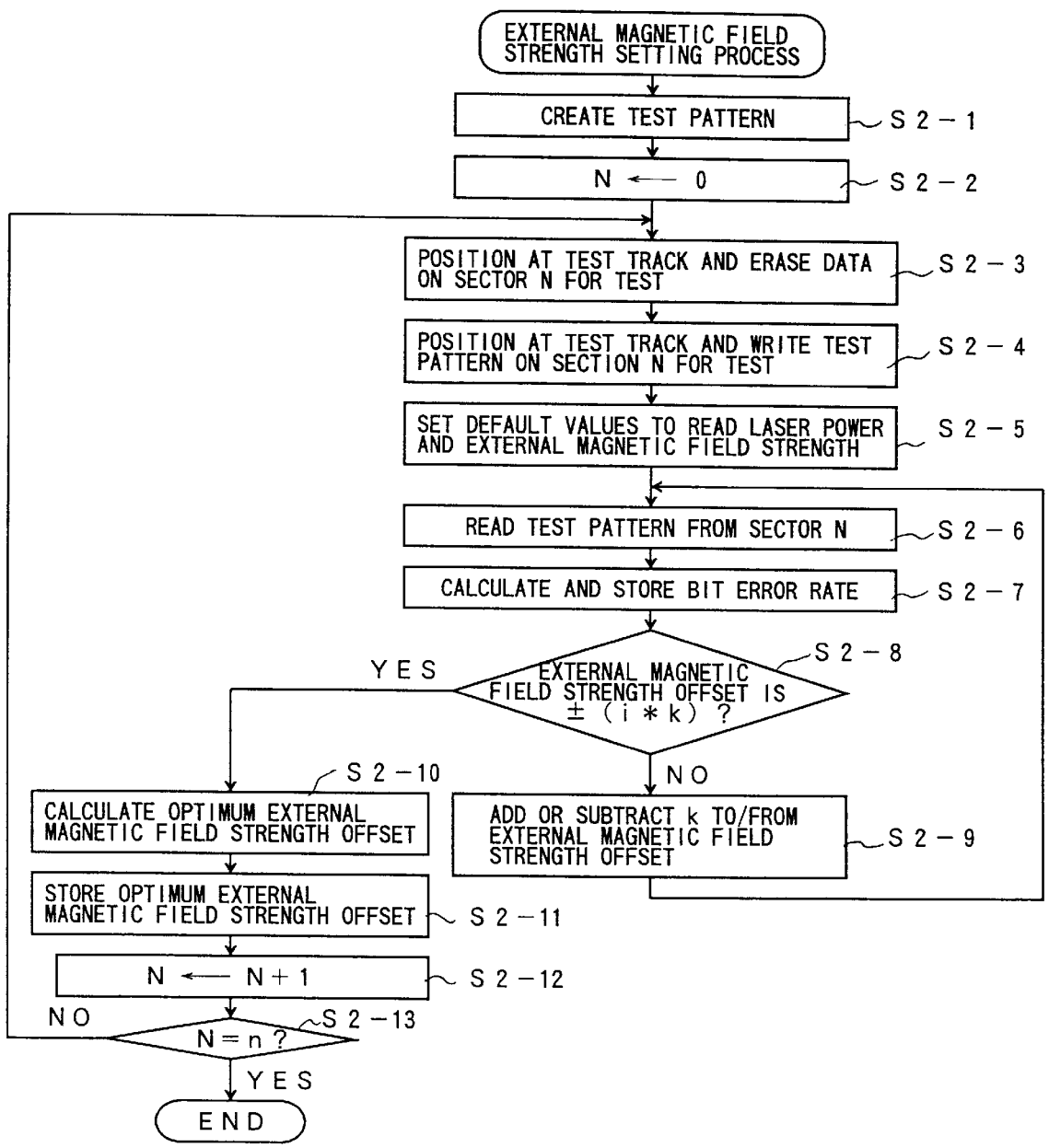
FIG. 12 is a flow chart for explaining an external magnetic field strength setting process according to the first embodiment of the present invention.

FIG. 12 is a flow chart for explaining the external magnetic field strength setting process according to the first embodiment of the present invention.

The MPU 14 executes the external magnetic field strength setting process. An execution timing of the external magnetic field strength setting process may be at a time when the recording medium is inserted or after a predetermined time passes, or when a first write or read command is supplied after the recording medium is inserted, or when retrying is processed due to an error, or when temperature is changed.

In the external magnetic field strength setting process, the MPU 14 creates and stores a test pattern in the buffer memory 20 (step S2-1).

Subsequently, a variable number N to identify a sector is set to '0' (step S2-2).

Moreover, the MPU 14 positions a laser spot at a test track provided at a predetermined area of the recording medium. The MPU 14 erases data on a sector N that is tested in the test track (step S2-3).

In the step S2-3, when the sector N for a test is erased, the test pattern stored in the buffer memory 20 in FIG. 6 in the step S2-1 is written in the sector N to be tested (step S2-4). When the capacity is the 128 MB capacity or the 230 MB capacity, the PPM recording is executed. When the capacity is the 540 MB or 640 MB capacity, or the 1.3 GB capacity, the PWM recording is executed.

In the step S2-4, the MPU 14 writes the test pattern in the sector N for a test and then sets default values (corresponding to initial values) for power of a laser spot and the external magnetic field strength (step S2-5). MPU 14 reads the test pattern from the sector N (step S2-6).

Next, the MPU 14 compares the test pattern read in the step S2-6 with the original test pattern that is created and stored in the buffer memory 20 in step S2-1. The MPU 14 calculates and stores a bit error rate in the internal memory of the MPU 14 (step S2-7). The bit error rate is obtained by the same method as that in the read-power setting process.

When the bit error rate e is calculated in the step S2-7, the MPU 14 sets +k as an external magnetic field strength offset and sets laser power (m0+k), where k is added to a default value m0, as an external magnetic field strength m of the laser spot. Then, the MPU 14 goes back to the step S2-6 and rereads the test pattern stored in the predetermined sector N for a test (steps S2-8 and S2-9).

The above steps S2-6 through S2-9 are processed again. Consequently, the bit error rate {em0,N}, {(em1,N}, . . . , {em(i−1),N}, {emi,N}, or {em(−1),N}, . . . , {em(−(i−1)), N}, or {em(−i),N} is obtained where the external magnetic field strength m of the laser spot is (m0+k), (m0+2k), . . . , (m0+(i−1)k), (m0+ik), or (m0−k), (m0−2k), . . . , (m0−(i−1)k), or (m0−ik), respectively. Each bit error rate e is stored.

By repeating the above steps S2-6 through S2-9, a characteristic of the bit error rate em for the external magnetic field strength m on the sector N is obtained.

It should be noted that the laser power that is constant, for example, is controlled to be a default value for reading.

In the external magnetic field strength setting process, an optimum external magnetic field strength is derived from the external magnetic field strength m and the bit error rate em.

Figure 13:
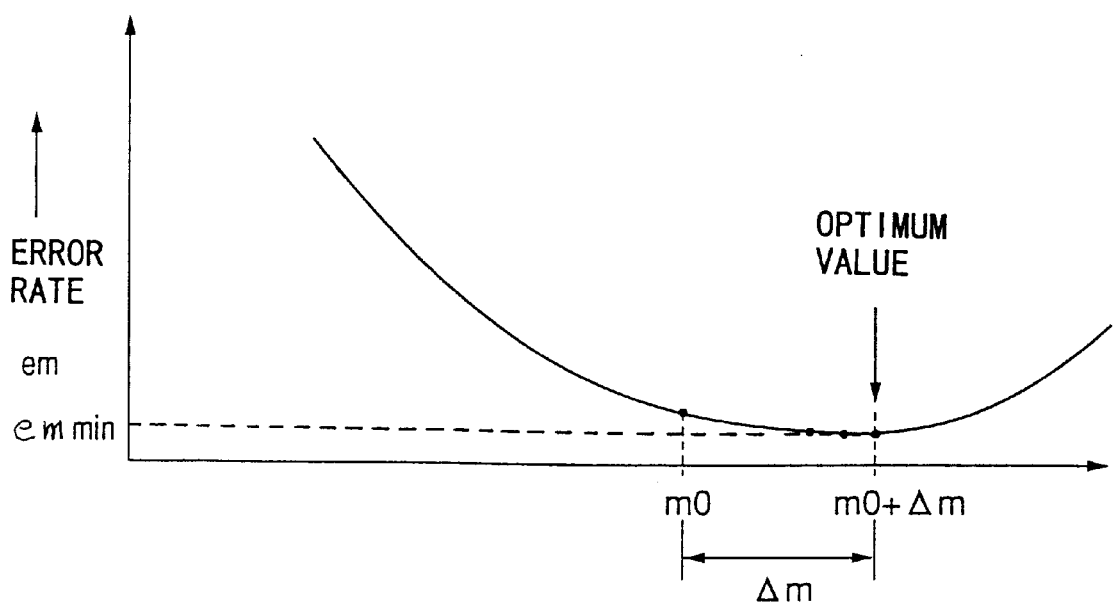
FIG. 13 is a graph showing a characteristic of the error rate for the external magnetic field strength according to the first embodiment of the present invention.

FIG. 13 is a graph showing a characteristic of the error rate for the external magnetic field strength according to the first embodiment of the present invention.

As shown in FIG. 13, between the external magnetic field strength from (m0−ik) and (m0+ik), the characteristic of an approximate U shape is obtained. In the characteristic in FIG. 13, the error rate is approximately flat and the external magnetic field strength at minimum error rate is an optimum external magnetic field strength. That is, the external magnetic field strength, where the error rate is smaller and both an effect of the recording medium and power consumption are less, is selected as the optimum external magnetic field strength.

For example, even if the external magnetic field strength m is increased, the magnetic field strength, where a state in which the error rate em is not changed is consecutively detected n times, is selected as the optimum external magnetic field strength.

FIG. 14 is a diagram showing a data structure of the external magnetic field setting table according to the first embodiment of the present invention.

The external magnetic field strength setting table 14c, for example, is provided in the internal memory of the MPU 14. As shown in FIG. 14, when the external magnetic field strength setting table 14c is divided into the n sectors #0 through #(n−1), the external magnetic field strength offsets $\Delta m0$ through $\Delta m(n-1)$ are set for sectors #0 through #(n−1), respectively.

By the external magnetic field strength setting process shown in FIG. 12, the external magnetic field strength offsets $\Delta m0$ through $\Delta m(n-1)$ are set for the sector #0 through #(n−1), respectively.

When data is read from the recording medium, the external magnetic field strength is controlled based on the external magnetic field strength offsets $\Delta m0$ through $\Delta m(n-1)$ stored in the external magnetic field strength setting table 14c.

In the external magnetic field strength setting process according to the present invention, a single measuring process of the error rate is executed for each external magnetic field strength. But error rates resulting from executing the measuring process many times may be averaged. Thus, the error rate can be improved and then it is possible to control the external magnetic field strength with high accuracy. In addition, using a plurality of test patterns for the measuring process of the error rate can improve the accuracy of measuring the error rate. Thus, it is possible to control the external magnetic field strength with high accuracy.

In the first embodiment, the optimum read-power offset and the optimum external magnetic field strength offset are obtained and determined for each sector. But alternatively, the bit error rates for all sectors may be measured and stored in an error rate table first and then the optimum read-power offsets and the optimum external magnetic field strength offsets may be obtained based on the error rates stored in the error rate table.

Figure 15:
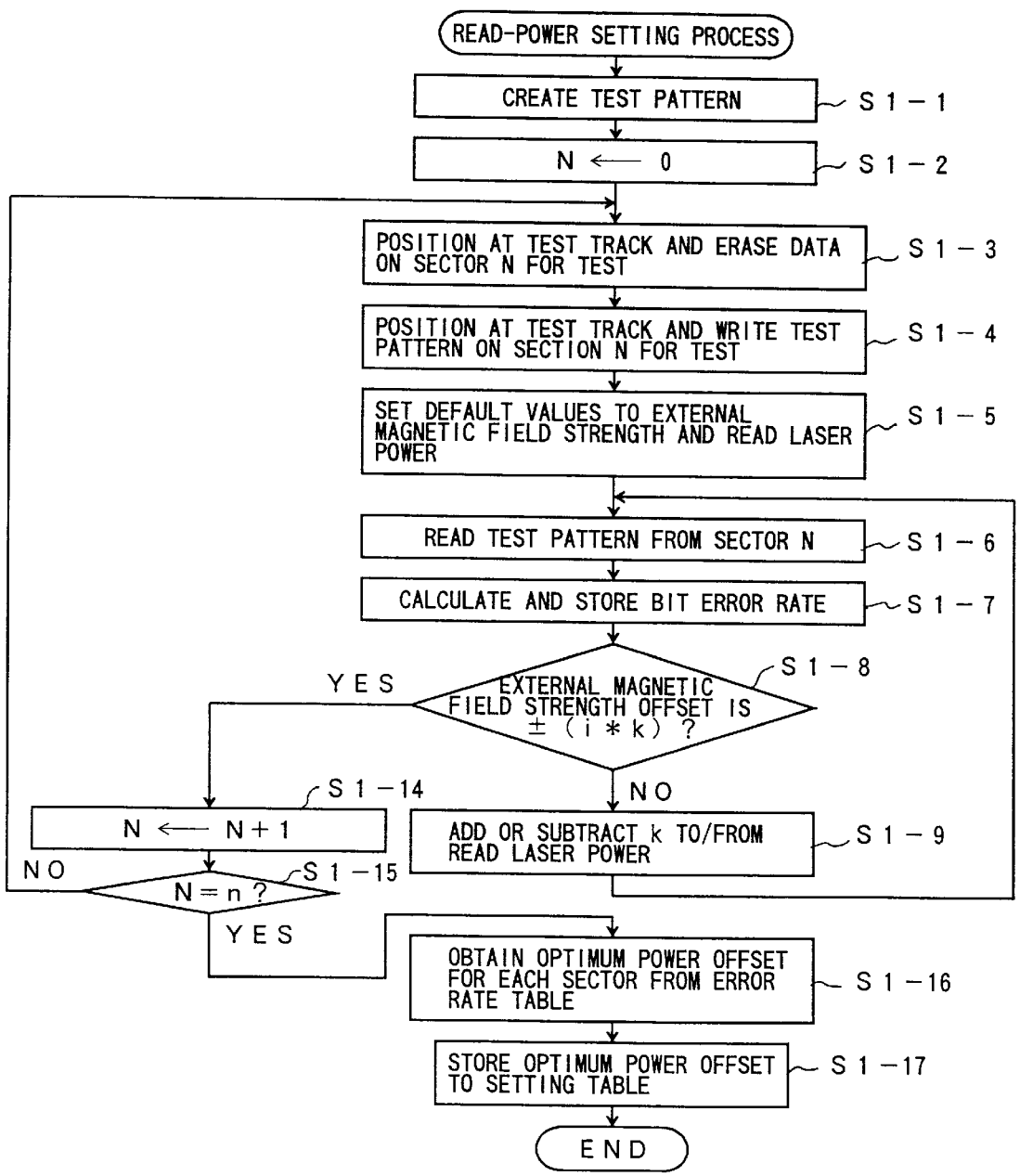
FIG. 15 is a flow chart for explaining a variation of the read-power setting process according to the first embodiment of the present invention.

FIG. 15 is a flow chart for explaining a variation of the read-power setting process according to the first embodiment of the present invention. In FIG. 15, steps that are the same as the ones in FIG. 9 are indicated by the same reference numerals and the description thereof will be omitted.

In this variation, the error rates for all sectors are obtained and stored in the error rate table first and then the optimum read-power offsets are obtained based on the error rates stored in the error rate table.

In the variation, the bit error rate resulting from repeating the above steps S1-6 through S1-9 in a predetermined sector for a test is obtained and stored. When the error rate for the predetermined sector is stored, a variable number N for identifying a test sector is incremented by 1. A next sector indicated by the variable number N+1 is processed by executing steps S1-6 through S1-9 and the error rate for the next sector is stored. The steps S1-6 through S1-9 are repeated until the variable number N reaches the total sector number n of the recording medium 72 (steps S1-14 and S1-15).

The external magnetic field strength generated by the electromagnets 44 is controlled by a default value for reading.

FIG. 16 is a diagram showing a data structure of an error rate table used in the variation of the read-power setting process according to the first embodiment of the present invention.

The error rate table 14d for LD power is provided, for example, in the internal memory of the MPU 14.

In the error rate table 14d, the bit error rate is stored for each of sectors #0 through #(n−1) in the step S1-7. The bit error rate is also stored for each LD power offset determined in the steps S1-5 and S1-9.

For example, when the test pattern in a sector #0 is read out with a default power p0 and a power offset 0 (zero) and the error rate results in {e0,0}, the error rate {e0,0} is stored in a cell indicated by the sector #0 and the power offset 0 (zero). Similarly, when the test pattern in a sector #(n−1) is read out with a default power p0+((i−1)*k) and a power offset (i−1)*k, the error rate e results in {e(i+1),(n−1)}, the error rate {e(i+1),(n−1)} is stored in a cell indicated by the sector #(n−1) and the power offset (i−1)*k.

By repeating the steps S1-3 through S1-15, the error rate table 14d for LD power shown in FIG. 16 is completed. In this variation, after the error rate table 14d is completed, the power offset where the bit error rate is smallest is obtained for each sector #0, . . . , or #(n−1) and the power offset is stored in the read-power setting table 14a (steps S1-16 and S1-17). Consequently, the read-power setting table 14a as the same as the table in FIG. 11 is completed.

Figure 17:
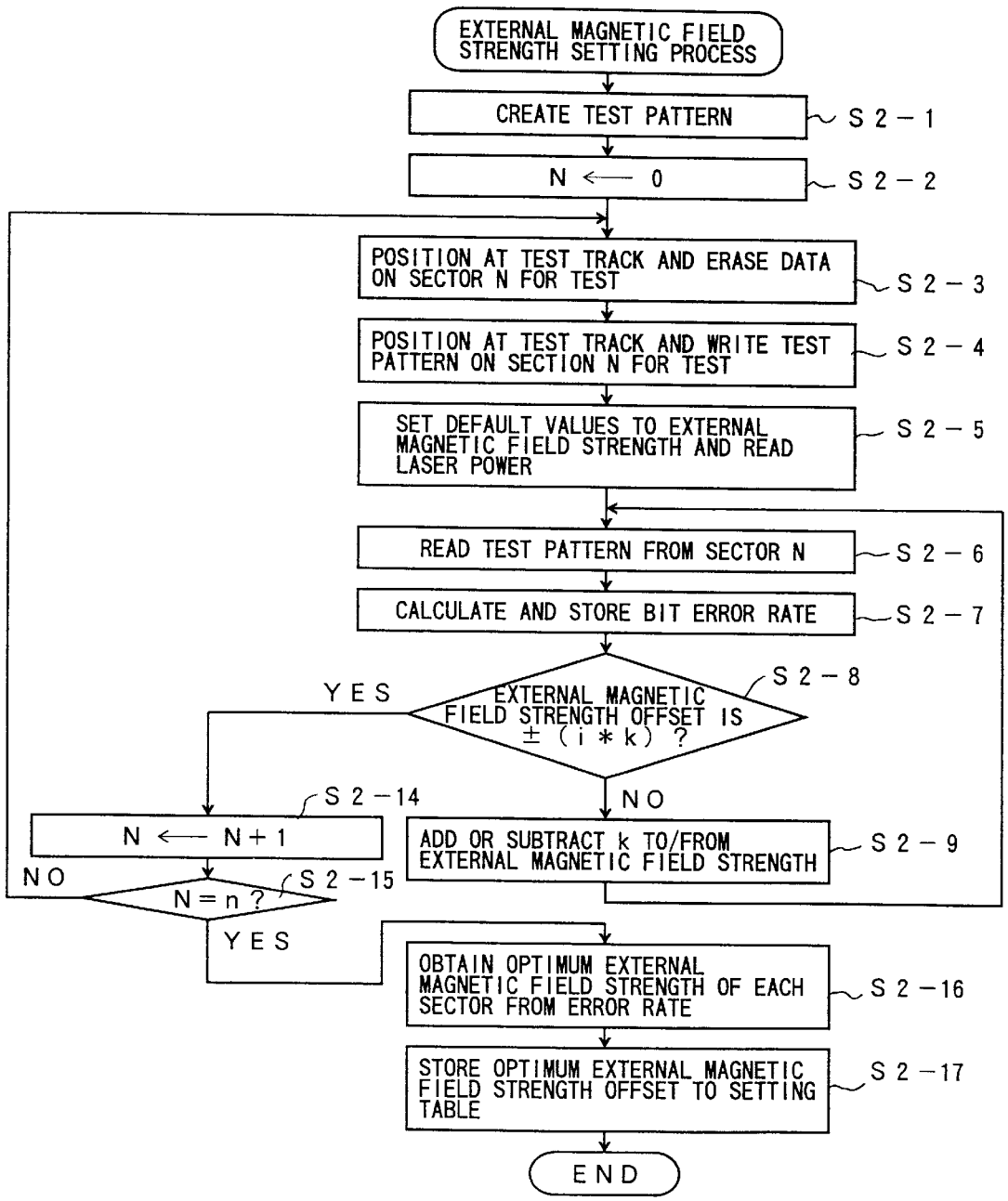
FIG. 17 is a flow chart for explaining a variation of the external magnetic field strength setting process according to the first embodiment of the present invention.

FIG. 17 is a flow chart for explaining a variation of the external magnetic field strength setting process according to the first embodiment of the present invention. In FIG. 17, steps that are the same as the ones in FIG. 12 are indicated by the same reference numerals and the description thereof will be omitted.

In the variation, the error rates for all sectors are obtained and stored in an error rate table first and then the optimum external magnetic field strength offsets is obtained based on the error rates stored in the error rate table.

In the variation, the bit error rate resulting from repeating the above steps S2-6 through S2-9 in a predetermined sector for a test is obtained and stored. When the bit error rate for the predetermined sector is stored, a variable number N for identifying a test sector is incremented by 1. A next sector indicated by the variable number N+1 is processed by executing steps S2-6 through S2-9 and the error rate for the next sector is stored. The steps S2-6 through S2-9 are repeated until the variable number N reaches the total sector number n of the recording medium 72 (steps S2-14 and S2-15).

The laser power is controlled by a default value reading.

FIG. 18 is a diagram showing a data structure of an error rate table used in the variation of the external magnetic field strength setting process according to the first embodiment of the present invention.

The error rate table 14e for the external magnetic field strength is provided, for example, in the internal memory of the MPU 14.

In the error rate table 14d, the bit error rate is stored for each of sectors #0 through #(n−1) in the step S2-7. The bit error rate is also stored for each LD power offset determined in the steps S2-5 and S2-9.

For example, when the test pattern in a sector #0 is read out with a default power m0 and a power offset 0 (zero) and the error rate results in {e0,0}, the error rate {e0,0} is stored in a cell indicated by the sector #0 and the power offset 0 (zero). Similarly, when the test pattern in a sector #(n−1) is read out with an external magnetic field strength m0+((i−1)*k) and a power offset (i−1)*k, the error rate e results in {em(i+1),(n−1)}, the error rate {em(i+1),(n−1)} is stored in a cell indicated by the sector #(n−1) and the power offset (i−1)*k.

By repeating the steps S2-3 through S2-15, the error rate table 14e for the external magnetic field strength shown in FIG. 18 is completed. In this variation, after the error rate table 14e is completed, the power offset where the error rate is smallest is obtained for each sector #0, . . . , or #(n−1) and the power offset is stored in the external magnetic field strength setting table 14b (steps S2-16 and S2-17). Consequently, the external magnetic field strength setting table 14b as the same as that in FIG. 14 is completed.

When a read command is supplied from a host apparatus, the read-power is controlled based on both the power offset set in the read-power setting table 14a and the external magnetic field strength offset set in the external magnetic field strength setting table 14c.

A reading process will now be described.

Figure 19:
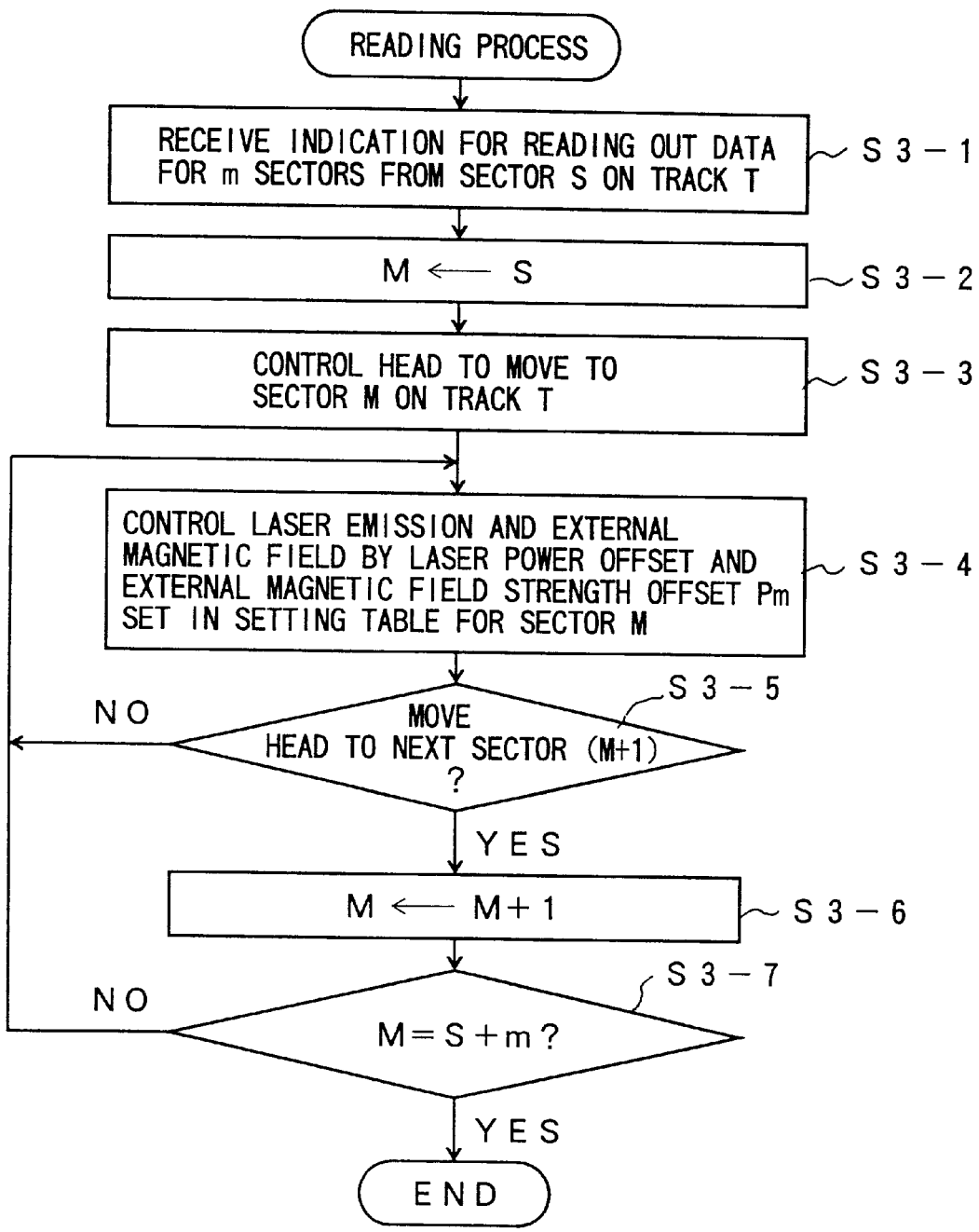
FIG. 19 is a flow chart for explaining the reading process according to the first embodiment of the present invention.

FIG. 19 is a flow chart for explaining the reading process according to the first embodiment of the present invention.

When the reading process is needed, a read command is supplied by the host apparatus (step S3-1). The read command supplied by the host apparatus indicates, for example, to read out data for m sectors from a sector S of a track T.

Subsequently, the sector S indicated in the step S3-1 is set to a sector M (step S3-2).

The MPU 14 controls a beam spot to move to the sector M of the track T (step S3-3).

When the beam spot is moved to the sector M of the track T as controlled in the step S3-3, the laser power offset and the external magnetic field strength offset stored in a cell of a setting table indicated by the track T and the sector M are read out and are set as an output laser power of the beam spot (step S3-4). The laser spot is optimized by setting the read-power offset stored in the read-power setting table 14a as a power offset. The external magnetic field strength is optimized by the external magnetic field strength offset stored in the external magnetic field strength setting table 14c.

When the laser spot moves to a next sector (M+1) (step S3-5), M is incremented by 1 (M=M+1) (step S3-6). And it is determined whether M is equal to S+m (step S3-7).

When it is determined that M reaches S+m, the laser spot ceases to read out data for m sectors from the sector S. Then, the reading process by the read command is terminated.

On the other hand, when it is determined in the step S3-7 that M has not reached S+m yet, the reading process goes back to the step S3-4. In the step S3-4, the MPU 14 reads out the laser power offset and the external magnetic field strength offset from the read-power setting table 14a and the external magnetic field strength setting table 14b, respectively, based on the sector M (=S+1). Then, the MPU 14 controls the laser power and the magnetic field strength of the laser spot.

As described above, the laser power and the external magnetic field strength of the laser spot is controlled by the laser power offset and the external magnetic field strength offset provided beforehand in the read-power setting table 14*a* and the external magnetic field strength setting table 14*c*.

Similarly to the read-power setting process and the reading process described above, a write-power setting process and a writing process are executed. In the writing process, a write-power is controlled based on a value set by the write-power setting process.

Figure 20:
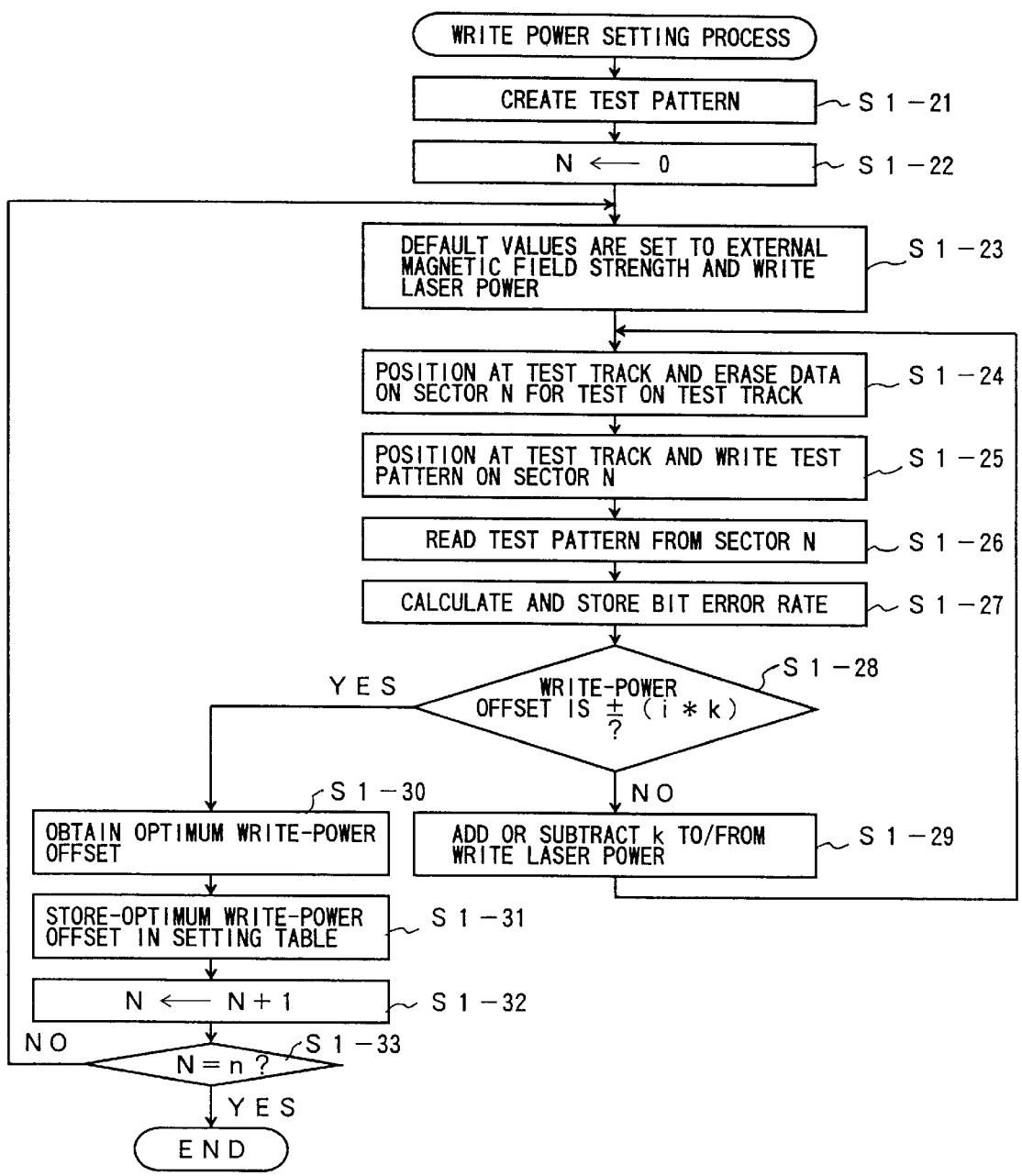
FIG. 20 is a flow chart for explaining the write-power setting process of the laser beam according to the first embodiment of the present invention.

FIG. 20 is a flow chart for explaining the write-power setting process of the laser beam according to the first embodiment of the present invention.

The MPU 14 executes the write-power setting process.

An execution timing of the write-power setting process may be at a time when the recording medium is inserted or after a predetermined time passes over, or when a first write or read command is supplied after the recording medium is inserted, or when retrying to process due to an error, or when temperature is changed.

In the write-power setting process of the laser beam, the MPU 14 creates and stores a test pattern in the buffer memory 20 (step S-21).

Subsequently, a variable number N to identify a sector is set to '0' (step S1-22). A default value is set to the write-power (step S1-23)

Moreover, the MPU 14 positions a laser spot at a test track provided at a predetermined area of the recording medium. The MPU 14 erases data on a sector N that is tested on the test track (step S1-24).

In the step S1-24, when the sector N for a test is erased, the test pattern stored in the buffer memory 20 in FIG. 6 in the step S1-21 is written in the sector N to be tested (step S1-25). When the capacity is the 128 MB capacity or the 230 MB capacity, the PPM recording is executed. When the capacity is the 540 MB or 640 MB capacity or the 1.3 GB capacity, the PWM recording is executed.

In the step S1-25, the MPU 14 writes the test pattern in the sector N for a test and then sets a default value (corresponding to an initial value) for power of a laser spot (step S1-26). MPU 14 reads the test pattern from the sector N (step S1-27).

Next, similarly to the read-power setting process, the MPU 14 compares the test pattern read in the step S1-26 with the original test pattern that is created and stored in the buffer memory 20 in step S1-21. The MPU 14 calculates and stores a bit error rate in the internal memory of the MPU 14 (step S1-27).

When the error rate e is calculated in the step S1-27, the MPU 14 sets +k as a write-power offset and sets laser power (p0+k), where k is added to a default value p0, as a write-power p of the laser spot. Then, the MPU 14 goes back to the step S1-24. After the MPU 14 erases data on the sector N and re-writes the test pattern stored in the predetermined sector N for a test, the MPU 14 reads the test pattern (steps S1-28 and S1-29).

The above steps S1-24 through S1-29 are processed again. Consequently, the bit error rate {e0,N}, {e1,N}, ..., {e(i−1),N}, {ei,N}, or {e(−1),N}, ..., {e(−(i−1)),N}, or {e(−i),N} is obtained where the write-power p of the laser spot is (p0+k), (p0+2k), ..., (p0+(i−1)k), (p0+ik), or (p0−k), (p0−2k), ..., (p0−(i−1)k), or (p0−ik), respectively. Each bit error rate e is stored.

By repeating the above steps S1-24 through S1-29, a characteristic of the bit error rate e for the write-power p on the sector N is obtained.

Thus, the MUP 14 selects the minimum error rate of the bit error rates obtained and stored by the steps S1-24 through S1-29. The MPU 14 stores the write-power offset Δpmin at the minimum error rate as a write-power for the sector N to the write-power setting table 14*b* (steps S1-30 and S1-31).

The MPU 14 increments a variable number N identifying a sector number by 1 and repeats the steps S1-23 through S1-29 until the variable number N reaches the sector number n provided on the recording medium. The MPU 14 obtains the optimum write-power offsets for all sectors #0 through #(n−1) provided on the recording medium and stores to the write-power setting table 14*b* (steps S1-32 and S1-33).

The external magnetic field strength generated by the electromagnets 44 is controlled to be a default value for writing.

Figure 21:
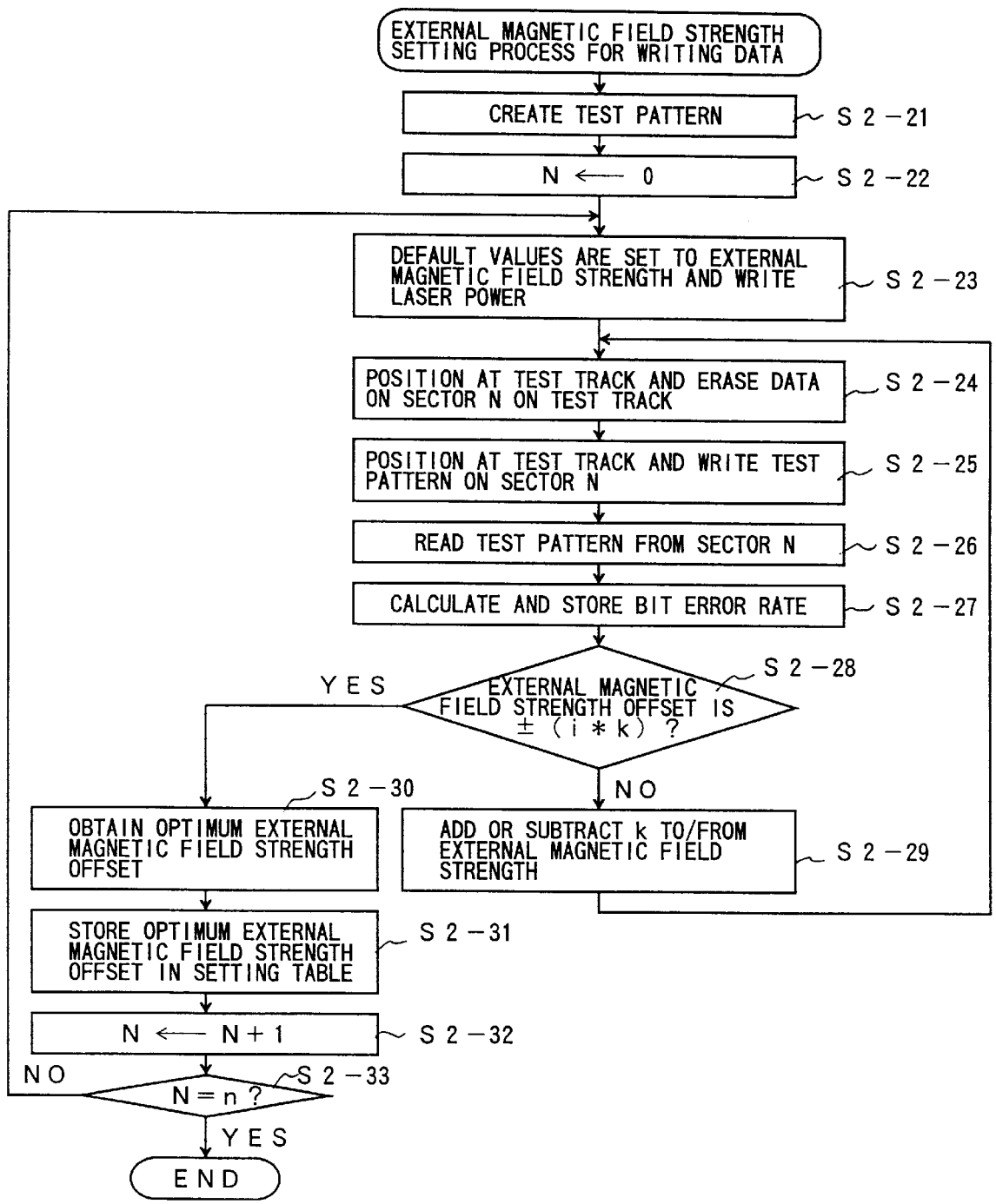
FIG. 21 is a flow chart for explaining the external magnetic field strength process according to the first embodiment of the present invention.

FIG. 21 is a flow chart for explaining the external magnetic field strength process for writing according to the first embodiment of the present invention.

The MPU 14 executes the external magnetic field strength process for writing every time the recording medium is inserted or a predetermined time passes over as the same manner as the write-power setting process.

In the external magnetic field strength setting process, the MPU 14 creates and stores a test pattern in the buffer memory 20 (step S2-21).

Subsequently, a variable number N to identify a sector is set to '0' (step S2-22). And a default value is set to the external magnetic field strength (step S2-23).

Moreover, the MPU 14 positions a laser spot at a test track provided at a predetermined area of the recording medium. The MPU 14 erases data on a sector N that is tested in the test track (step S2-24).

In the step S2-24, when the sector N for a test is erased, the test pattern stored in the buffer memory 20 in FIG. 6 in the step S2-21 is written in the sector N to be tested (step S2-25). When the capacity is the 128 MB capacity, the PPM recording is executed. When the capacity is the 230 MB, the 540 MB or 640 MB capacity, or the 1.3 GB capacity, the PWM recording is executed.

In the step S2-25, the MPU 14 writes the test pattern in the sector N for a test and reads the test pattern from the sector N (step S2-26).

Next, the MPU 14 compares the test pattern read in the step S2-26 with the original test pattern that is created and stored in the buffer memory 20 in step S2-21. The MPU 14 calculates and stores a bit error rate in the internal memory of the MPU 14 (step S2-27).

When the bit error rate e is calculated in the step S2-27, the MPU 14 sets +k as an external magnetic field strength offset and sets laser power (p0+k), where k is added to a default value p0, as an external magnetic field strength p of the laser spot. Then, the MPU 14 goes back to the step S2-24. After the MPU 14 erases data on the sector N and writes the test pattern, the MPU 14 reads the test pattern (steps S2-28 and S2-29).

The above steps S2-24 through S2-2s9 are processed again. Consequently, the bit error rate {em0,N}, {em1,N}, ..., {em(i−1),N}, {emi,N}, or {em−1,N}, ..., {em(−(i−1)),N}, or {em−i,N} is obtained where the external magnetic field strength m of the laser spot is (m0+k), (m0+2k), ..., (m0+(i−1)k), (m0+ik), or (m0−k), (m0−2k), ..., (m0−(i−1)k), or (m0−ik), respectively. Each bit error rate e is stored.

By repeating the above steps S2-24 through S2-29, a characteristic of the bit error rate em for the external magnetic field strength m on the sector N is obtained.

Thus, the MPU 14 selects the minimum error rate of the bit error rates obtained and stored by the steps S2-24 through S2-29. The MPU 14 stores the external magnetic field strength offset Δmmin at the minimum error rate as an external magnetic field strength for the sector N to the external magnetic field strength setting table 14c (steps S2-30 and S2-31).

The MPU 14 increments a variable number N identifying a sector number by 1 and repeats the steps S2-23 through S2-31 until the variable number N reaches the sector number n provided on the recording medium. The MPU 14 obtains the optimum external magnetic field strength offsets for all sectors #0 through #(n−1) provided on the recording medium and stores to the external magnetic field strength setting table 14c (steps S2-32 and S2-33).

In this case, the write laser power and the read laser power are controlled to be default values.

The write-power setting table 14b and the external magnetic field strength table 14c for writing are the same as those in FIG. 11 and FIG. 14 and the description thereof is omitted.

In the same manner as the read-power setting process, after the bit error rates for all sectors are obtained and stored in the error rate table, the optimum write-power offsets may be obtained based on the bit error rates stored in the error table.

When data is written, based on the write-power setting table 14b and the external magnetic field strength setting table 14c, the write-power of the laser beam and the external magnetic field strength are controlled to write data properly.

Figure 22:
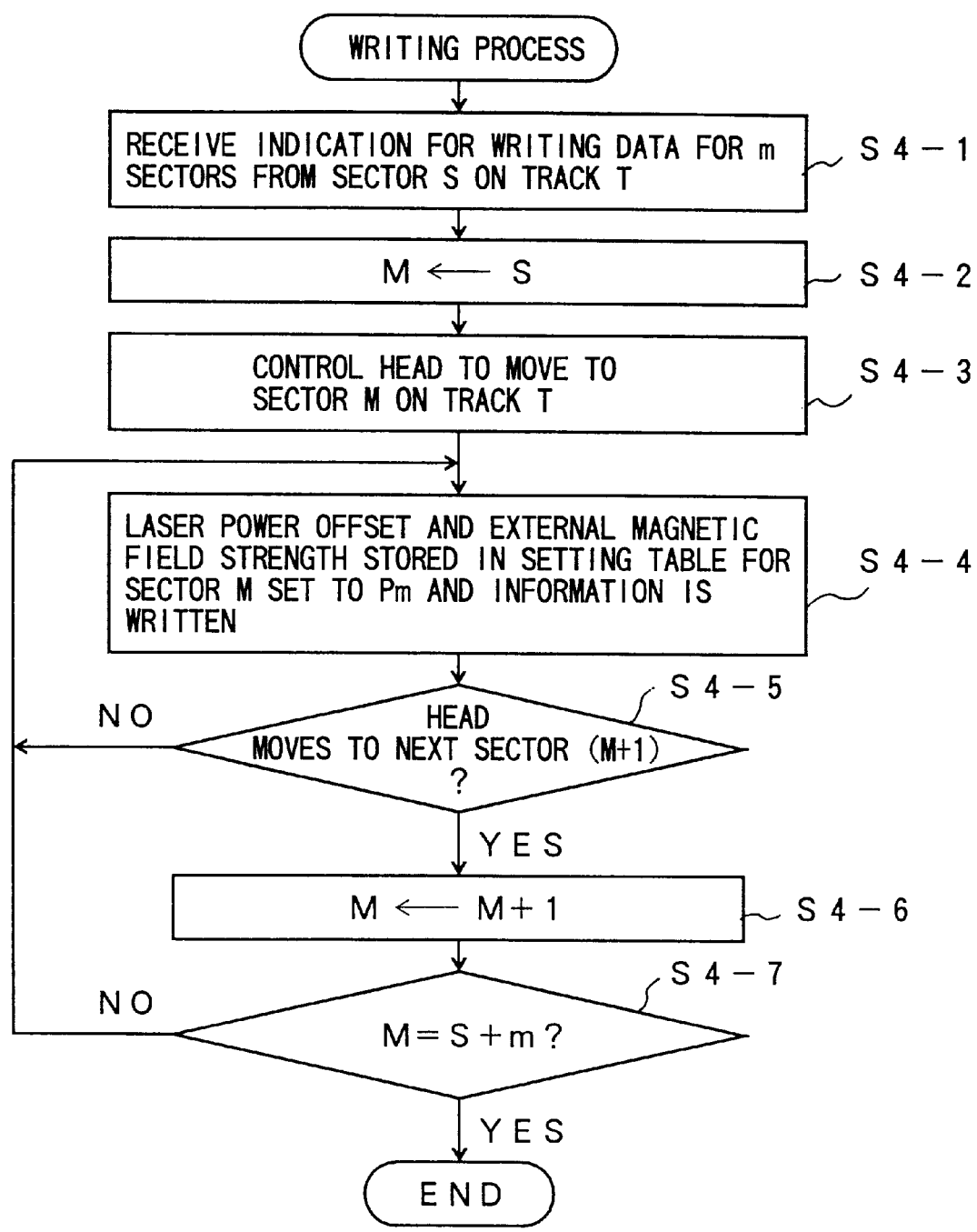
FIG. 22 is a flow chart for explaining the writing process according to the first embodiment of the present invention.

FIG. 22 is a flow chart for explaining the writing process according to the first embodiment of the present invention.

Similarly to the reading process, in the writing process, a write command is supplied by the host apparatus (step S4-1). The read command supplied by the host apparatus indicates, for example, to write data for m sectors from a sector S of a track T.

Subsequently, the sector S indicated in the step S4-1 is set to a sector M (step S4-2).

The MPU 14 controls a beam spot to move to the sector M of the track T (step S4-3).

When the beam spot is moved to the sector M of the track T as indicated in the step S4-3, a laser power offset and an external magnetic field strength offset stored in a cell of a setting table indicated by the track T and the sector M are read out and are set as an output laser power of the beam spot (step S4-4). The laser spot is optimized by setting a write-power offset stored in the write-power setting table 14b as a power offset. The external magnetic field strength is optimized by the external magnetic field strength offset stored in the external magnetic field strength setting table 14c.

When the laser spot moves to a next sector (M+1) (step S4-5), M is incremented by 1 (M=M+1) (step S4-6). And it is determined whether M is equal to S+m (step S4-7).

When it is determined that M reaches S+m, the laser spot completes to write data for m sectors from the sector S. Then, the writing process by the write command is terminated.

On the other hand, when it is determined in the step S4-7 that M has not reached S+m yet, the writing process goes back to the step S4-4. In the step S4-4, the MPU 14 reads out the laser power offset from the external magnetic field strength setting table 14b based on the sector M (=S+1). Then, the MPU 14 controls the laser power of the laser spot.

As described above, according to the present invention, the laser power of the laser spot and the external magnetic field strength generated by the electromagnets 44 are controlled based on the laser power offset and the external magnetic field strength offset that are predetermined as optimum offsets for each sector or block. That is, the laser power of the laser spot illuminating the recording medium and the external magnetic field strength being applied to the recording medium are controlled to be optimized for each sector. Thus, even if the recording medium is not perpendicular to the rotation axis of the spindle motor, the optimum laser power offset and the external magnetic field strength offset are measured and set in the setting tables 14a, 14b and 14c for each sector or block. Accordingly, it is possible to read out or write data properly by controlling the laser power of the laser spot and the external magnetic field strength based on information in the setting tables 14a, 14b and 14c.

In a recording medium in which data is read by applying in external magnetic field such as an MSR (Magnetic Super Resolution), when the external magnetic field is not properly applied, information stored in the recording medium can not be read. Advantageously, according to the present invention, it is possible to read information from the recording medium by controlling the external magnetic field strength.

The present invention, in order to eliminate the disadvantages of the recording medium such as an MSR, describes how to control the external magnetic field strength to optimize both when data is written and when data is read. But, the external magnetic field strength may be optimized only when data is written in a case in which the present invention is applied to a recording medium that does not require an external magnetic field strength when data is read.

Moreover, the present invention describes how to determine and control the laser power and the external magnetic field strength when data is written or read. A magneto optical disc, generally, is capable of erasing, writing and reading. Thus, the laser power and the external magnetic field strength are determined and controlled when data is erased as well as when data is written or read.

In another application, the optimum write-power or read-power and the external magnetic field strength as determined above may be used for detecting defects of a magneto optical disc. That is, data can be always read or written in a normal condition when the optimum write-power or read-power and the external magnetic field strength are used.

Thus, it is determined that a recording medium itself has a defect, when data can not be properly written or read in a state of using the optimum write-power or read-power and the external magnetic field strength. In this embodiment, an external magnetic field strength slightly different from the optimum external magnetic field strength is used to detect a defect.

Figure 23:
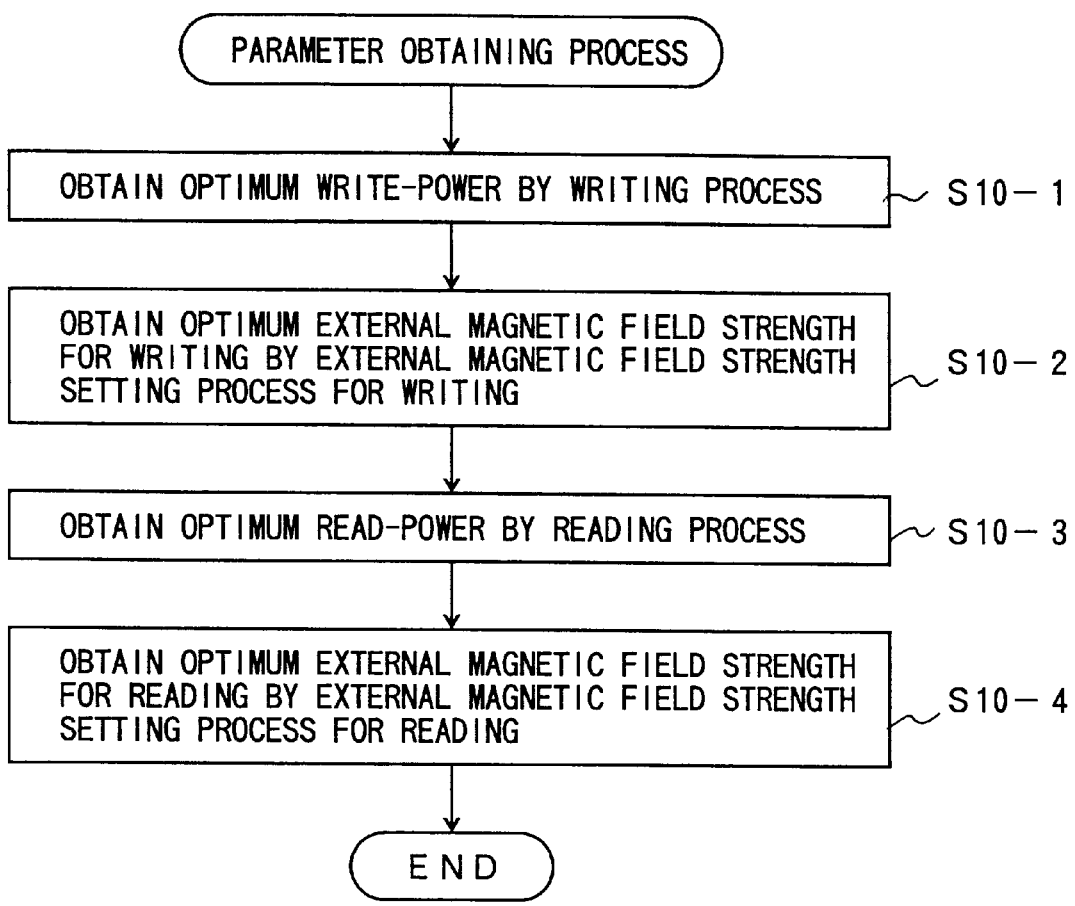
FIG. 23 is a flow chart for explaining a parameter obtaining process to detect defects according to the first embodiment of the present invention.

FIG. 23 is a flow chart for explaining a parameter obtaining process to detect defects according to the first embodiment of the present invention.

In order to detect defects, the optimum write-power and read-power and the optimum external magnetic field strength are obtained first.

The optimum write-power and read-power and both optimum external magnetic field strengths for writing and reading are obtained from the processes in FIGS. 9, 12, 15, 17, 20 and 21 and stored (steps S10-1 through S10-4).

External magnetic field strengths for both reading and writing are set to be slightly different from the optimum external magnetic field strengths for reading and writing and are used to detect defects while the optimum write-power and read-power are used. In this state, the writing process and the reading process are executed. Defects are detected by detecting errors.

A recording medium defect detecting process will now be described.

Figure 24:
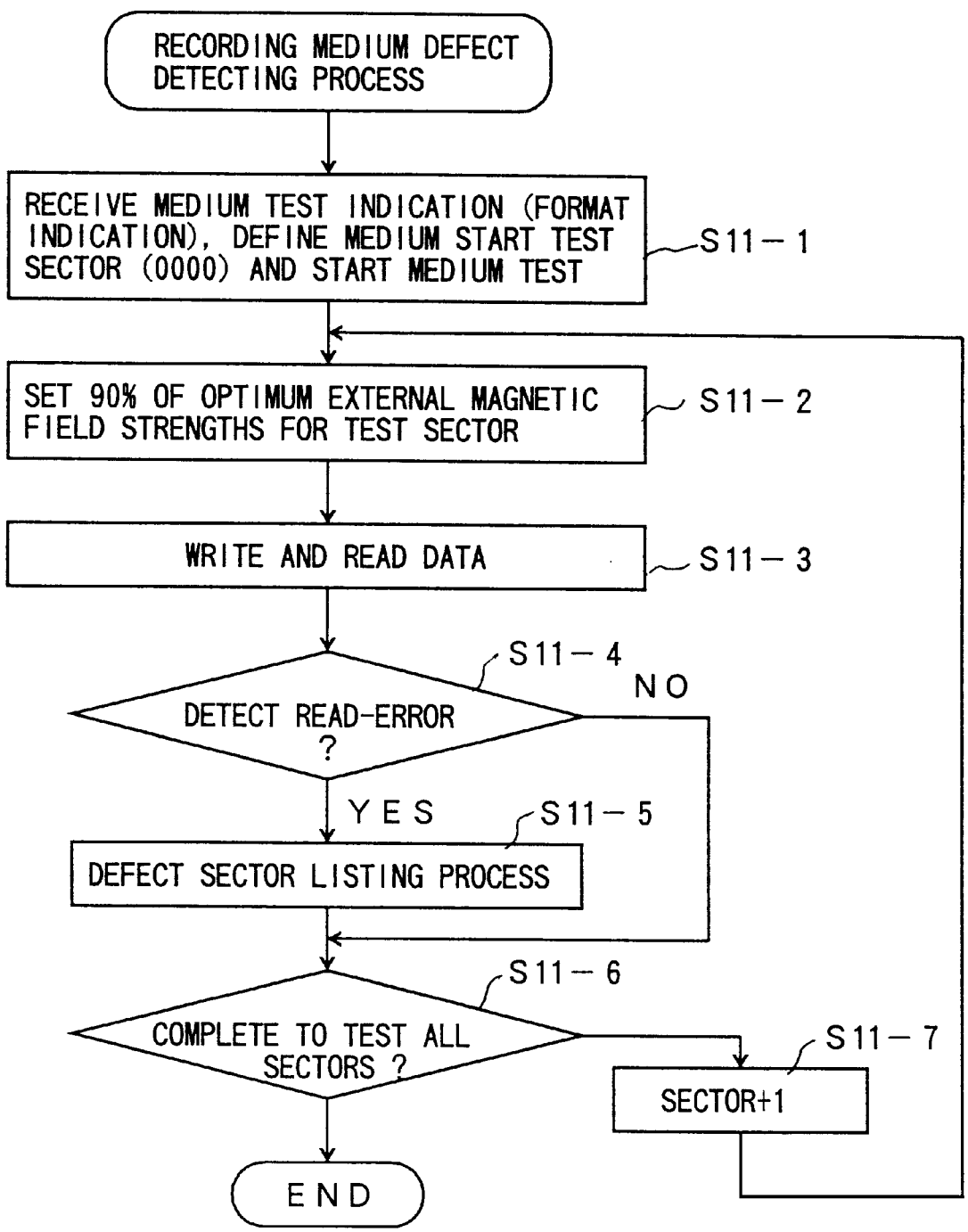
FIG. 24 is a flow chart for explaining the recording medium defect detecting process according to the first embodiment of the present invention.

FIG. 24 is a flow chart for explaining the recording medium defect detecting process according to the first embodiment of the present invention.

The recording medium defect detecting process is executed in response to a medium test indication from the host apparatus. When the medium test indication is supplied from the host apparatus, a medium test start sector is set as a sector for a test (step S11-1).

When the medium test start sector is set as a sector for a test in the step S11-1, the optimum write-power and read-power and the optimum external magnetic field strengths for writing and reading are retrieved for the medium test start sector. The optimum write-power and read-power and 90% of the optimum external magnetic field strengths for writing and reading are set for testing (step S11-2).

Data is written and read on/from the medium test start sector by using the optimum write-power and read-power and 90% of the optimum external magnetic field strengths for writing and reading (step S11-3).

It is determined based on the result of writing or reading whether a read-error is detected (step S11-4).

When the read-error is detected in the step S11-4, a defect sector listing process is executed (step S11-5). The steps S11-2 through S11-5 are repeatedly executed each time a sector number is incremented by 1 and then all sectors are tested (step S11-6).

The defect sector listing process in the step S11-5 is executed to register a defect sector where the read-error is detected to a defect list. The defect list is provided in a control area of the recording medium. When data is written on or read from the recording medium, the defect list is referred to. Information is stored to and read from sectors other than the defect sectors listed in the defect list.

Figure 25:
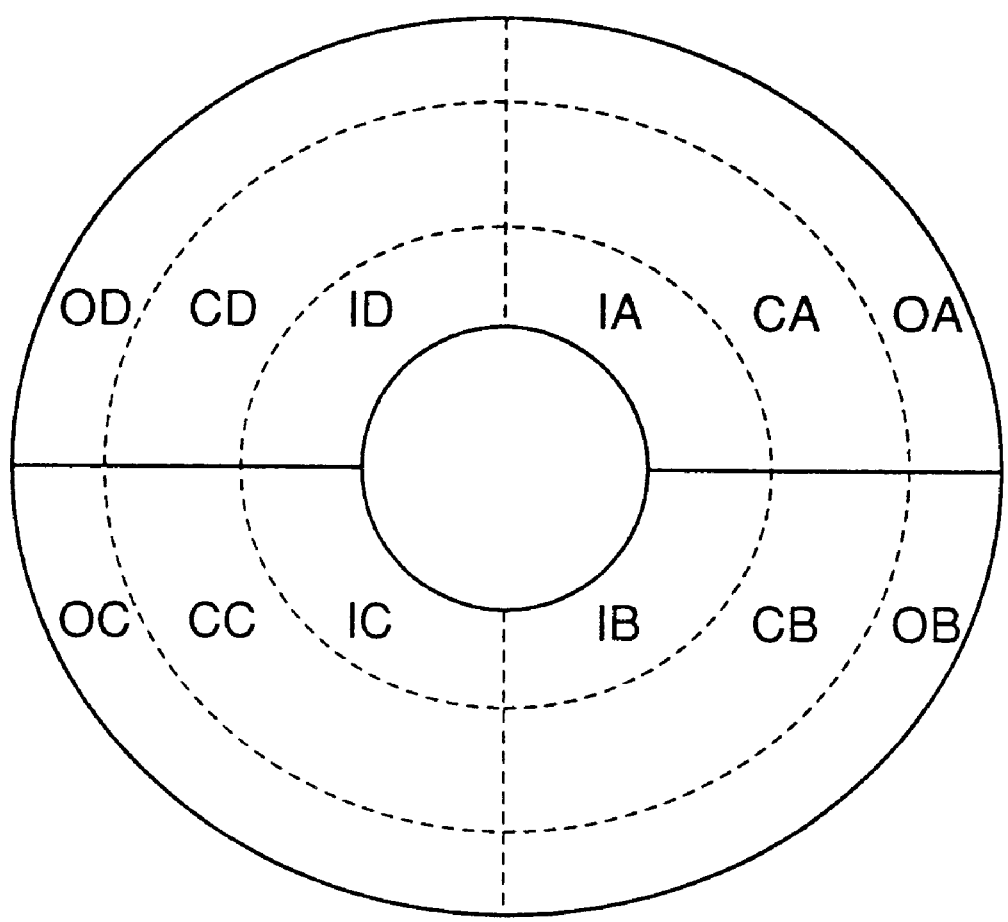
FIG. 25 is a diagram for explaining an operation of the medium defect detecting process according to the first embodiment of the present invention.

FIG. 25 is a diagram for explaining an operation of the medium defect detecting process according to the first embodiment of the present invention.

For example, the optimum write-power and read-power and the optimum external magnetic field strengths for writing and reading are determined for each block as shown in FIG. 25. In this case, when sectors in a block IA are test sectors, the writing process and the reading process are executed based on the optimum write-power and read-power and the optimum external magnetic field strengths for writing and reading defined for the sectors.

When sectors in a block IB are test sectors, the writing process and the reading process are executed based on the optimum write-power and read-power and the optimum external magnetic field strengths for writing and reading defined for the sectors.

Based on the result of the writing process and the reading process in the step S11-3, the presence of a read-error is determined (step S11-4). When it is determined that the read-error is detected in the step S11-4, it is determined that a defect is in the test sectors and the defect sector listing process is executed to store a test sector position as defect information (step S11-5).

On the other hand, when the read-error is not detected based on the result of the writing process and the reading process in step S11-4, it is determined that no read-error is in the test sectors.

The above steps S11-2 through S11-5 are processed each time the sector number is incremented by 1. Then, all sectors are tested (steps S11-6 and S11-7)

In the present invention, 90% of the optimum external magnetic field strengths are set and then data is written and read. In this case, when a read-error is detected, it is determined that the recording medium has a defect and then defect information is provided.

The above recording medium defect detecting process may be executed by an instruction from a host computer when a PDL (Primary Defect List), that is a medium defect list, is created in a manufacturing process. That is, the optical disc drive 1 corresponding to an information storage apparatus according to the present invention can be applied to a defect testing apparatus for a recording medium.

According to the present invention, a defect of a recording medium is detected by using the optimum external magnetic field strengths beforehand.

In the first embodiment, 90% of the optimum external magnetic field strengths are used. But alternatively, 110% of the optimum external magnetic field strengths may be used and then the reading process and the writing process are executed.

The information storage apparatus according to the first embodiment can be used for other types of media. It is possible to adjust the magnetic field strengths based on the type of the media.

Furthermore, in the embodiment in a case of a recording medium to be read without a magnetic field, the laser power is controlled so that an output signal becomes stronger. In a case of a recording medium applying the MSR method, both the laser power and the magnetic field strength can be controlled so as to certainly carry out the Double-Mask RAD (Rear Aperture Detection) based on magnetized states of a readout layer and an intermediate layer.

In the embodiment, offset information for each sector is provided in the read-power setting table 14a, the write-power setting table 14b and the external magnetic field strength setting tables 14c. But alternatively, for example, in a case of controlling a recording medium formatted by the zoned CAV, sectors arranged in a radial direction may be divided into predetermined zones. The read-power and the write-power setting tables 14a and 14b and the external magnetic field strength setting tables 14c may provide offset information for each zone in addition to each sector. Accordingly, the laser power of the laser spot may be controlled on each sector in each zone based on the read-power and write-power setting tables 14a and 14b. The external magnetic field strength may be controlled on each sector in each zone based on the external magnetic field strength setting tables 14c. The above control will now be described according to a second embodiment of the present invention.

Figure 26:
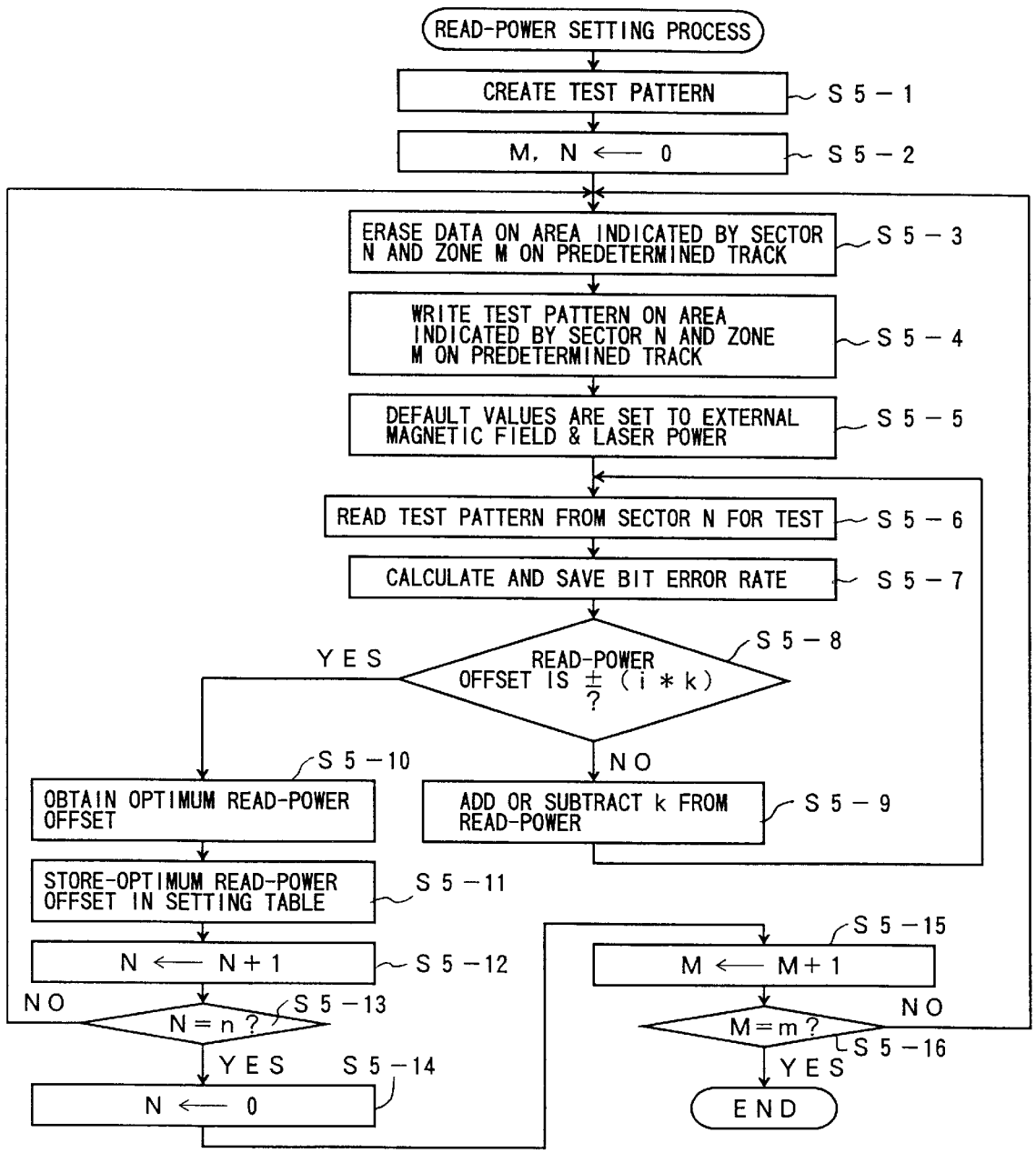
FIG. 26 is a flow chart for explaining a read-power setting process according to a second embodiment of the present invention.

FIG. 26 is a flow chart for explaining a read-power setting process according to the second embodiment of the present invention. In the second embodiment, a configuration is the same as that in the first embodiment and the description thereof will be omitted.

In the second embodiment, the laser power is controlled on each zone in addition to each sector. Thus, the read-power setting process is different from that in the first embodiment.

In the second embodiment, in addition to the variable number N identifying a sector, a variable number M identifying one of m zones, which divide the circumference of the recording medium 72 into m areas, is used.

The MPU 14 creates a test pattern and then initializes the variable numbers N and M (steps S5-1 and S5-2).

Figure 27:
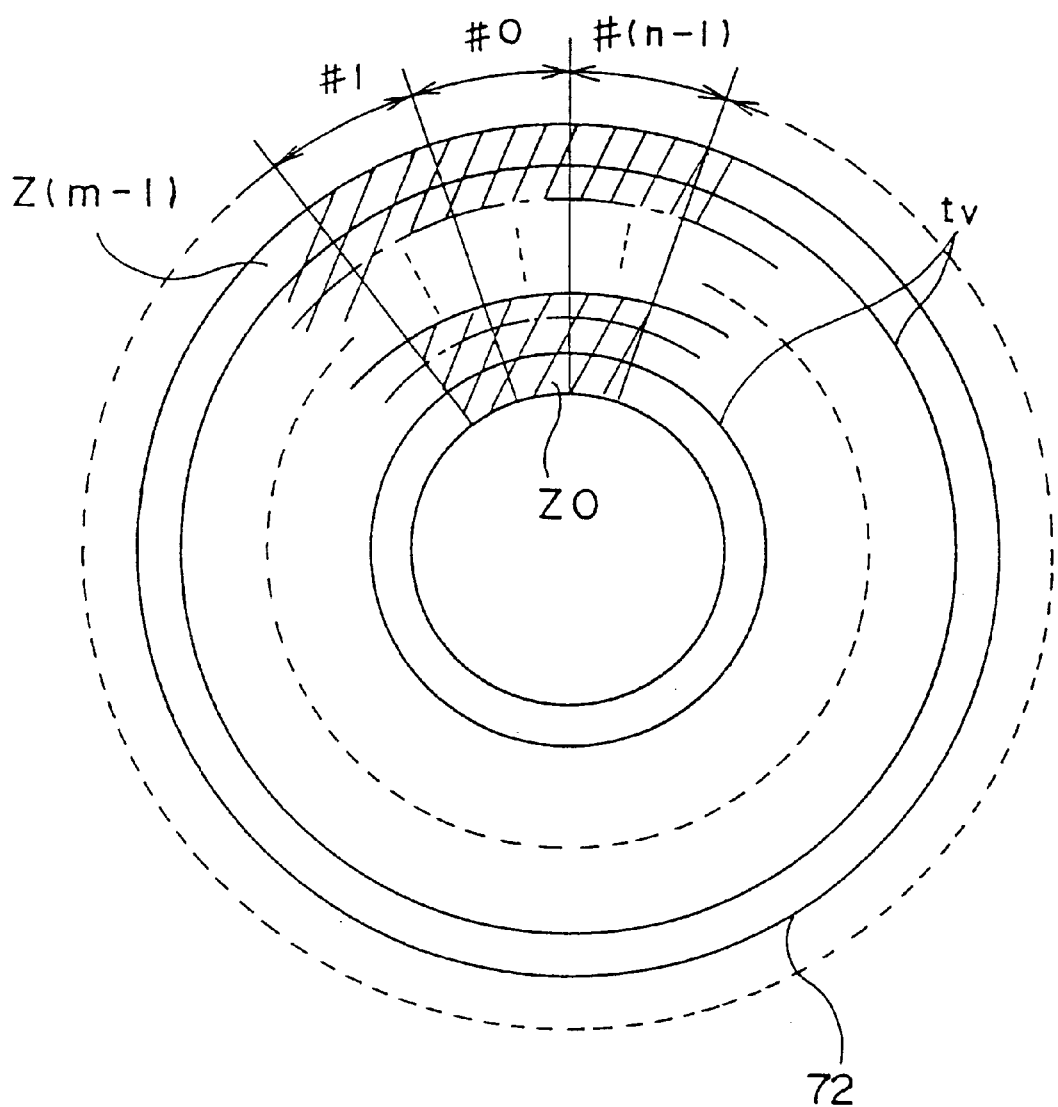
FIG. 27 is a diagram showing a formatted recording medium according to the second embodiment of the present invention.

FIG. 27 is a diagram showing a formatted recording medium according to the second embodiment of the present invention.

In the second embodiment, the recording medium is divided into n sectors from #0 through #(n−1) in the circumferential direction and divided into m zones from Z0 through Z(m−1) in the radial direction.

The MPU 14 erases areas indicated by the sector N and the zone M on a predetermined track and writes the test pattern created in the step S5-1 (step S5-3). The test pattern written in the step S5-1 is read by a default power p0 and a bit error rate is obtained and stored (steps S5-5, S5-6 and S5-7).

The above steps S5-5 and S5-6 are executed by changing the read-power in order to read the test pattern and obtain and store the bit error rate (steps S5-8 and S5-9).

An offset, where the bit error rate obtained by repeating the steps S5-6 through S5-9 is smallest, is stored as an optimum read-power on areas indicated by the sector N and the zone M in the read-power setting table 14a (steps S5-10 and S5-11). The above steps S5-3 through S5-11 are executed each time the sector N is incremented by 1. Thus, when the steps S5-3 through S5-11 are executed n times, read-power offsets for the sector #0 through #(n−1) in the zone M are determined and stored in the read-power setting table 14a.

When the MPU 14 completes to set the optimum read-power offsets for the sector #0 through. #(n−1) in the zone M in the read-power setting table 14a, the MPU 14 resets the variable number N identifying a sector and increment the variable number M by 1. The steps S5-3 through S5-14 are repeatedly executed each time the variable number M is incremented by 1 until the variable number M reaches the total number m of zones (steps S5-15 and S5-16).

The read-power offsets for each sector in each zone are set in the read-power setting table 14a.

In this case, an external magnetic field strength for reading generated by the electromagnets 44 is controlled to be a default value when data is read.

FIG. 28 is a diagram showing a data structure of the read-power setting table according to the second embodiment of the present invention.

The read-power setting table 14a in the second embodiment provides read-power offset setting areas A0 through A(n−1) corresponding to sectors #0 through #(n−1), respectively. And each of read-power offset setting areas A0 through A(n−1) stores offsets for zones Z0 through Z(m−1). Each offset is represented by one of read-power offsets $\Delta p00$ through $\Delta p(n-1)(m-1)$ An external magnetic field strength setting process for reading in the second embodiment will now be described.

Figure 29:
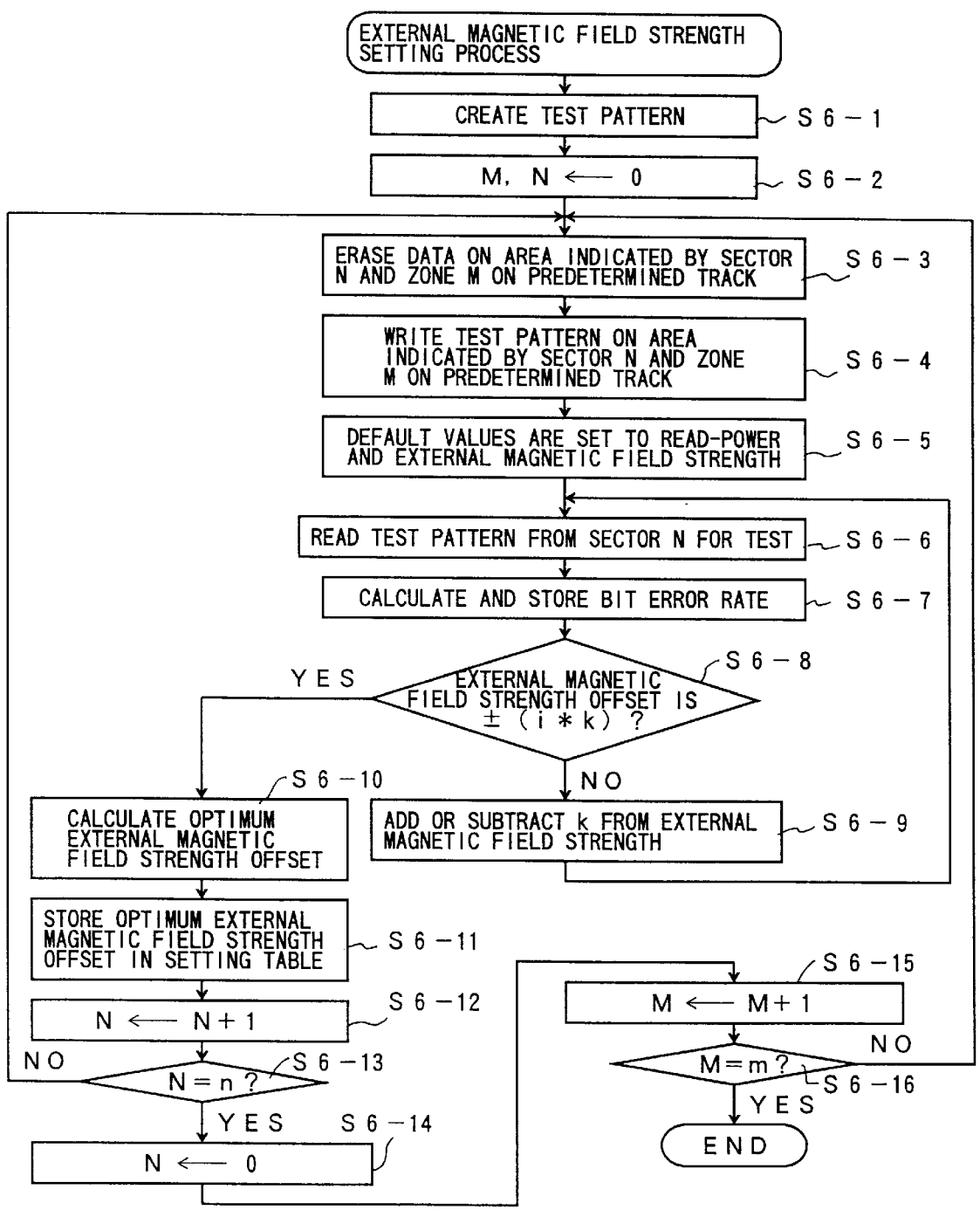
FIG. 29 is a flow chart for explaining an external magnetic field strength setting process for reading according to the second embodiment of the present invention.

FIG. 29 is a flow chart for explaining the external magnetic field strength setting process for reading according to the second embodiment of the present invention.

In the second embodiment, in addition to the variable number N identifying a sector, a variable number M identifying one of zones, which divides the circumference of the recording medium 72 into m areas, is used.

The MPU 14 creates a test pattern and then initializes the variable numbers N and M (steps S6-1 and S6-2)

The MPU 14 erases areas indicated by the sector N and the zone M on a predetermined track and writes the test pattern created in the step S6-1 (step S6-3). The test pattern written in the step S6-1 is read by a default power p0 and a bit error rate is obtained and stored (steps S6-5, S6-6 and S6-7).

The above steps S6-5 and S6-6 are executed by changing the external magnetic field strength for reading in order to read the test pattern and obtain and store the bit error rate (steps S6-8 and S6-9).

An offset, where the bit error rate obtained by repeating the steps S6-6 through S6-9 is smallest, is stored as an optimum external magnetic field strength on areas indicated by the sector N and the zone M in the external magnetic field strength setting table 14c (steps S6-10 and S6-11). The above steps S6-3 through S6-11 are executed each time the sector N is incremented by 1. Thus, when the steps S6-3 through S6-11 are executed n times, external magnetic field strength offsets for the sector #0 through #(n−1) in the zone M are determined and stored in the external magnetic field strength setting table 14c.

When the MPU 14 completes to set the optimum external magnetic field strength offsets for the sector #0 through #(n−1) in the zone M in the external magnetic field strength setting table 14c, the MPU 14 resets the variable number N identifying a sector and increment the variable number M by 1. The steps S6-3 through S6-14 are repeatedly executed each time the variable number M is incremented by 1 until the variable number M reaches the total number m of zones (steps S6-15 and S6-16).

The external magnetic field strength offsets for each sector in each zone are set in the external magnetic field strength setting table 14c.

In this case, a read-power is controlled to be a default value.

FIG. 30 is a diagram showing a data structure of the external magnetic field strength setting table according to the second embodiment of the present invention.

The external magnetic field strength setting table 14c in the second embodiment provides external magnetic field strength offset setting areas A0 through A(n−1) corresponding to sectors #0 through #(n−1), respectively. And each of external magnetic field strength offset setting areas A0 through A(n−1) stores offsets for zones Z0 through Z(m−1) Each offset is represented by one of external magnetic field strength offsets $\Delta m00$ through $\Delta m(n-1)(m-1)$ A reading process in the second embodiment will now be described.

Figure 31:
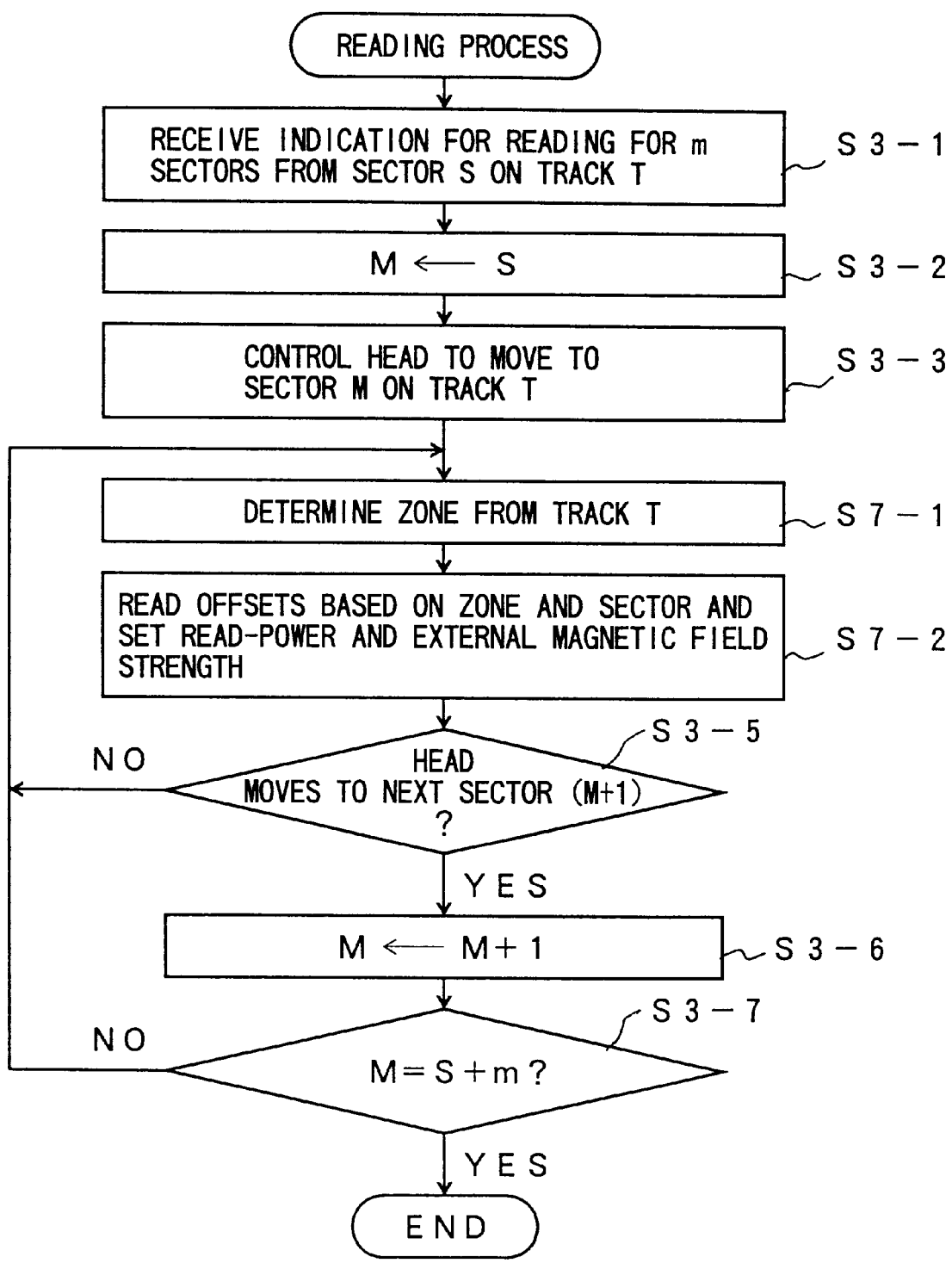
FIG. 31 is a flow chart for explaining a reading process according to the second embodiment of the present invention.

FIG. 31 is a flow chart for explaining the reading process according to the second embodiment of the present invention. In FIG. 31, steps that are the same as the ones in FIG. 19 are indicated by the same reference numerals and the description thereof will be omitted.

In the second embodiment, when a read command from the host apparatus is received, the MPU 14 controls to move to a sector M on a track T and then a zone is determined based on the indicated position on the track T (step S7-1) . A read-power offset and an external magnetic field strength offset are determined from the read-power setting table 14a and the external magnetic field strength setting table 14c based on the zone and the sector. A read-power and an external magnetic field strength are set by adding the determined read-power offset and external magnetic field strength offset to default values, respectively (step S7-2).

A write-power setting process is controlled in the same manner.

FIG. 32 is a flow chart for explaining the write-power offsetting process according to the second embodiment of the present invention. In the second embodiment, a configuration is the same as that in the first embodiment and the description thereof will be omitted.

In the second embodiment, the laser power is controlled on each zone in addition to each sector. Thus, the write-power setting process is different from that in the first embodiment.

In the second embodiment, in addition to the variable number N identifying a sector, a variable number M identifying one of zones, which divides the circumference of the recording medium 72 into m areas, is used.

The MPU 14 creates a test pattern and then initializes the variable numbers N and M (steps S5-21 and S5-22).

The MPU 14 sets default values to the write-power and the external magnetic field strength (step S5-23). Subsequently, the MPU 14 erases areas indicated by the sector N and the zone M on a predetermined track and writes the test pattern created in the step S5-11 (steps S5-24 and S5-25). The test pattern written in the step S5-25 is read by a predetermined read-power and a bit error rate is obtained and stored (steps S5-26 and S5-27).

The above steps S5-24 through S5-27 are executed by changing the read-power in order to erase, write and read the test pattern and obtain and store the bit error rate (steps S5-28 and S5-29).

An offset, where the bit error rate obtained by repeating the steps S5-24 through S5-29 is smallest, is stored as an optimum write-power on areas indicated by the sector N and the zone M in the write-power setting table 14b (steps S5-30 and S5-31). the above steps S5-23 through S5-31 are executed each time the sector N is incremented by 1. Thus, when the steps S5-23 through S5-31 are executed n times, write-power offsets for the sector #0 through #(n−1) in the zone M are determined and stored in the write-power setting table 14b.

When the MPU 14 completes to set the optimum write-power offsets for the sector #0 through #(n−1) in the zone M in the write-power setting table 14a, the MPU 14 resets the variable number N identifying a sector and increment the variable number M by 1. The steps S5-23 through S5-34 are repeatedly executed each time the variable number M is incremented by 1 until the variable number M reaches the total number m of zones (steps S5-35 and S5-36).

The write-power offsets for each sector in each zone are set in the write-power setting table 14b.

In this case, an external magnetic field strength for writing generated by the electromagnets 44 is controlled to be a default value for writing.

An external magnetic field strength setting process for writing in the second embodiment will now be described.

Figure 33:
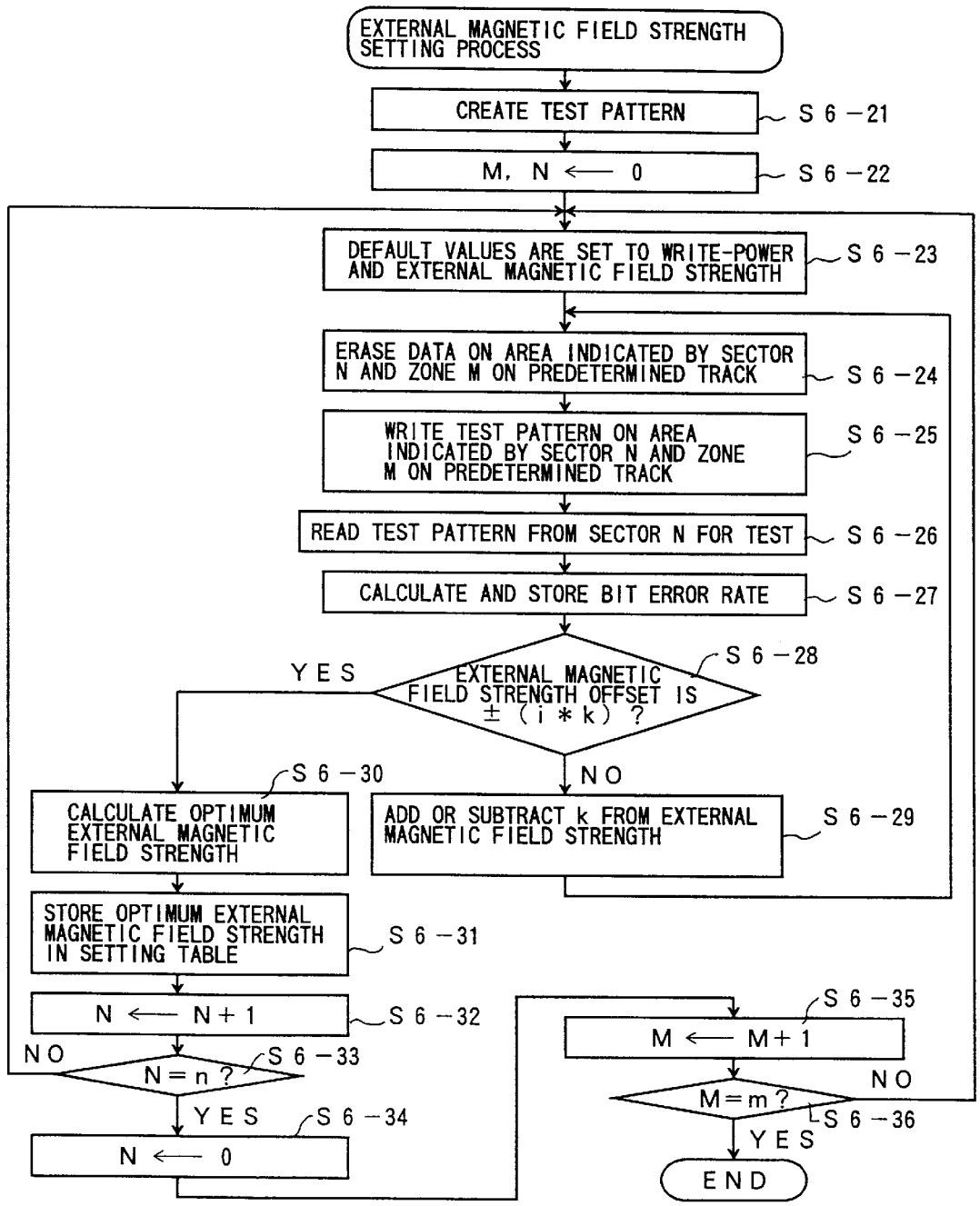
FIG. 33 is a flow chart for explaining an external magnetic field strength setting process for writing according to the second embodiment of the present invention.

FIG. 33 is a flow chart for explaining the external magnetic field strength setting process for writing according to the second embodiment of the present invention.

In the second embodiment, in addition to the variable number N identifying a sector, a variable number M identifying one of m zones, which divides the circumference of the recording medium 72 into m areas, is used.

The MPU 14 creates a test pattern and then initializes the variable numbers N and M (steps S6-21 and S6-22).

The MPU 14 sets default values to the write-power and the external magnetic field strength (step S6-23). The MPU 14 erases areas indicated by the sector N and the-zone M on a predetermined track and writes the test pattern created in the step S6-11 (steps S6-24 and S6-25). The test pattern written in the step S6-25 is read by a predetermined external magnetic field strength and a bit error rate is obtained and stored (steps S6-26 and S6-27).

The above steps S6-24 through S6-27 are executed by changing the write-power in order to erase, write and read the test pattern and obtain and store the bit error rate (steps S6-28 and S6-29).

An offset, where the bit error rate obtained by repeating the steps S6-24 through S6-29 is smallest, is stored as a optimum external magnetic field strength on areas indicated by the sector N and the zone M in the external magnetic field strength setting table 14c (steps S6-30 and S6-31). The above steps S6-23 through S6-31 are executed each time the sector N is incremented by 1. Thus, when the steps S6-23 through S6-31 are executed n times, external magnetic field strength offsets for the sector #0 through #(n−1) in the zone M are determined and stored in the external magnetic field strength setting table 14c.

When the MPU 14 completes to set the optimum external magnetic field strength offsets for the sector #0 through #(n−1) in the zone M in the external magnetic field strength setting table 14c, the MPU 14 resets the variable number N identifying a sector and increment the variable number M by 1. The steps S6-23 through S6-34 are repeatedly executed each time the variable number M is incremented by 1 until the variable number M reaches the total number m of zones (steps S6-35 and S6-36).

The external magnetic field strength offsets for each sector in each zone are set in the external magnetic field strength setting table 14c.

In this case, a write-power is controlled to be a default value.

Another writing process based on the write-power offsets and the external magnetic field strength offsets determined in the write-power setting table 14b and the external magnetic field strength setting table 14c will now be described.

Figure 34:
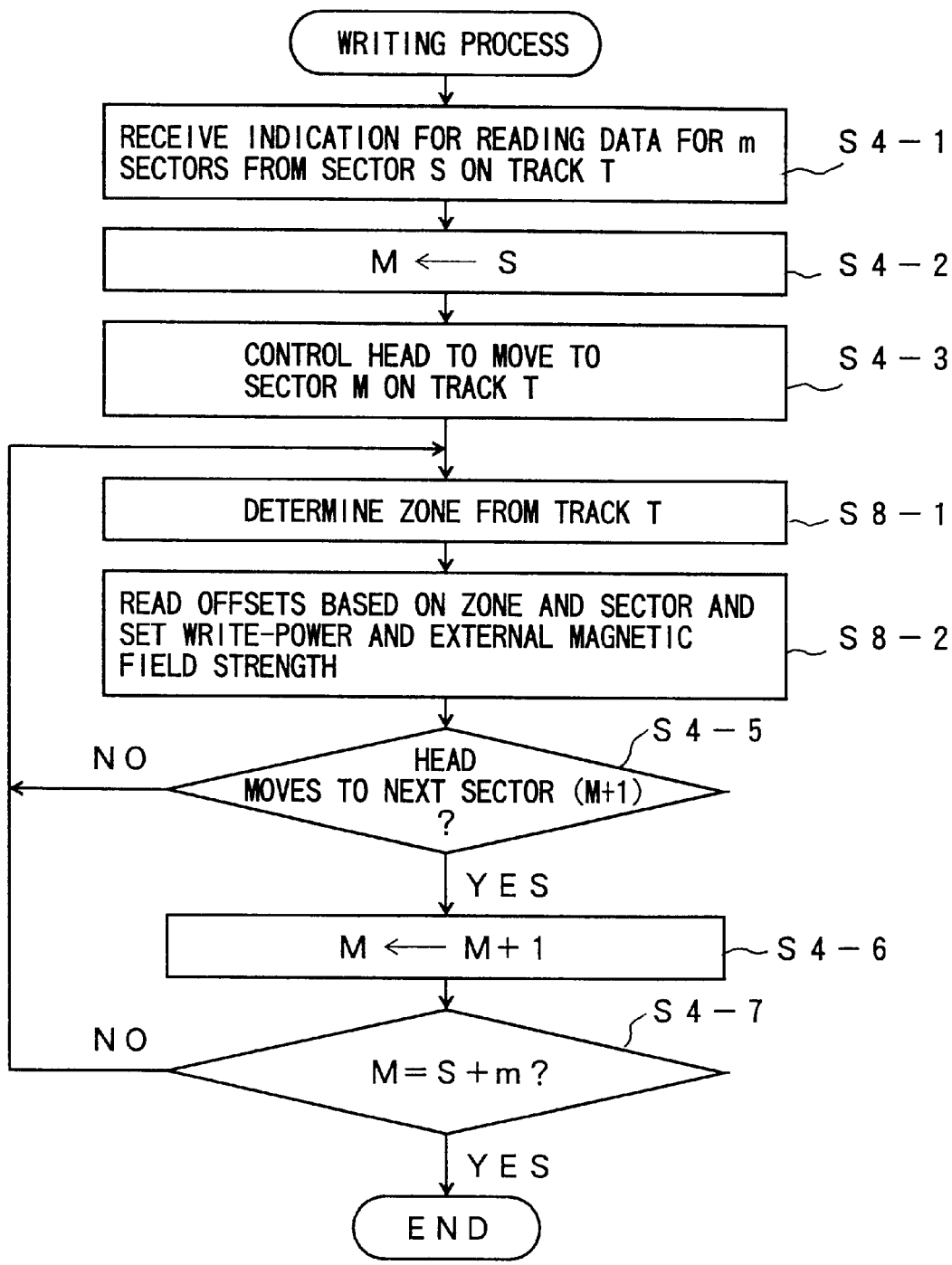
FIG. 34 is a flow chart for explaining another writing process according to the second embodiment of the present invention.

FIG. 34 is a flow chart for explaining another writing process according to the second embodiment of the present invention. In FIG. 32, steps that are the same as the ones in FIG. 22 are indicated by the same reference numerals and the description thereof will be omitted.

In the second embodiment, when a write command from the host apparatus is received, the MPU 14 controls to move a sector M on a track T and then a zone is determined based on the indicated position on the track T (step S8-1). A write-power offset and an external magnetic field strength offset are determined from the write-power setting table 14b and the external magnetic field strength setting table 14c based on the zone and the sector. A write-power and an external magnetic field strength are set by adding the determined write-power offset and external magnetic field strength offset to default values, respectively (step S8-2).

In the second embodiment, the laser power and the external magnetic field strength are controlled by the zone in addition to the sector. Thus, it is possible to properly read or write data even in a state of displacement of the laser power or change of the external magnetic field strength caused by transformation of the recording medium in a radial direction.

In the first and second embodiments, the power offset and the external magnetic field strength are determined for each sector. But alternatively, the power offset and the external magnetic field strength may be determined for a block of predetermined numbers of sequential sectors.

Moreover, in another application, the optimum write-power or read-power and the external magnetic field strengths as determined above may be used for detecting defects of the recording medium.

Another read-power setting process, in which the power offset and the external magnetic field strength are determined for a block of predetermined numbers of sequential sectors, will now be described according to a third embodiment. In the third embodiment, a configuration is the same as that in the first embodiment and the description thereof will be omitted.

Figure 35:
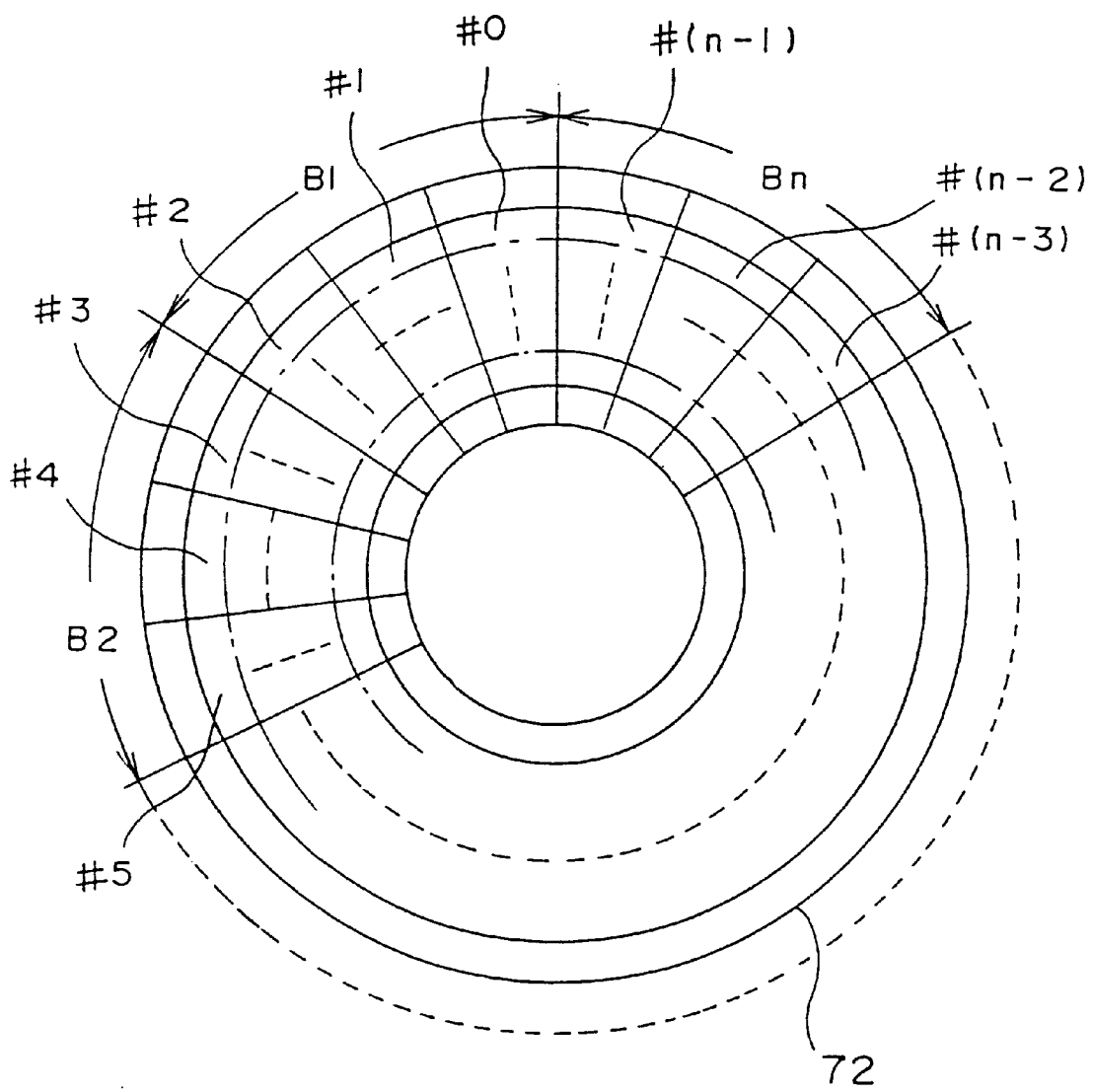
FIG. 35 is a diagram showing a formatted recording medium according to the third embodiment of the present invention.

FIG. 35 is a diagram showing a formatted recording medium according to the third embodiment of the present invention.

In the third embodiment, the recording medium 72 is divided into n blocks: a block 1 for sectors #0, #1 and #2, a block 2 for sectors #3, #4 and #5, . . . and a block n for sectors #(n−3), #(n−2) and #(n−1). The read-power offset and the external magnetic field strength are determined for each block. The read-power and write-power setting processes and the external magnetic field strength setting processes are executed, for example, in the same methods as those described in FIGS. 9, 12, 15, 17, 20, 21, 26, 29, 32 and 33 for each block B1, . . . or Bn instead of each sector. The description thereof will be omitted.

In the third embodiment, the reading or writing process is executed based on each block B1, ... or Bn. Thus, structures of the read-power setting table 14a, the write-power setting table 14b and the external magnetic field strength setting tables 14c are different from those of tables in the first and second embodiments.

FIG. 36 is a diagram showing a data structure of the read-power setting table according to the third embodiment of the present invention.

The read-power setting table 14a according to the third embodiment of the present invention provides power offsets $\Delta p0$ through $\Delta p(n-1)$ based on blocks B1 through Bn, respectively.

When a read or write command is received, the read-power setting table 14a shown in FIG. 36 is referred to and the read-power is determined.

Figure 37:
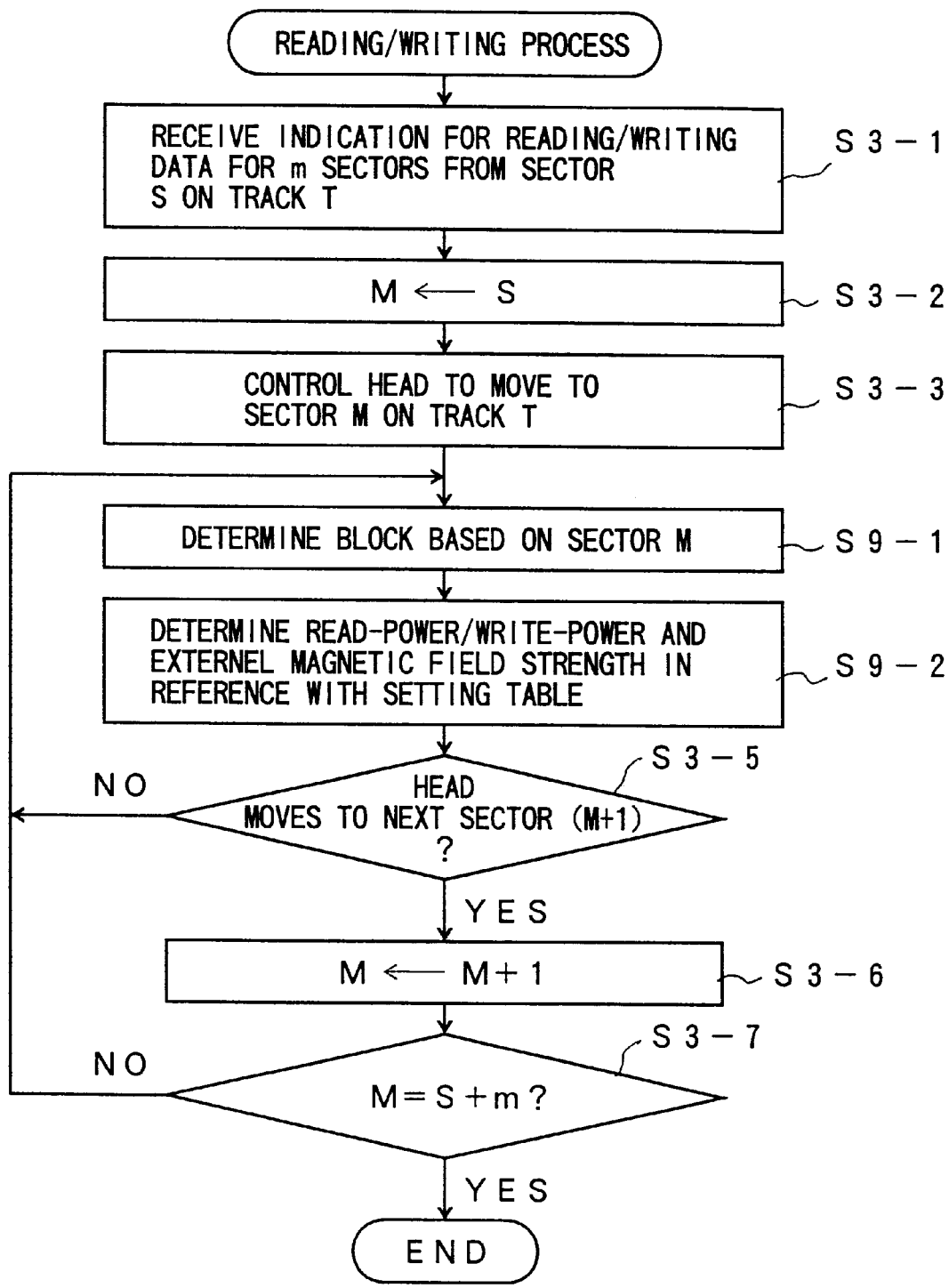
FIG. 37 is a flow chart for explaining the reading or writing process.

FIG. 37 is a flow chart for explaining the reading or writing process. In FIG. 32, steps that are the same as the ones in FIG. 19 are indicated by the same reference numerals and the description thereof will be omitted.

In the third embodiment, in response to the read or write command from a host apparatus, the MPU 14 controls to move to a sector M on a track T in step S3-3 and then determines a block based the sector M indicated (step S9-1). The MPU 14 determines a read-power or write-power offset and the external magnetic field strength offset corresponding to the block determined in step S9-1 in the read-power setting table 14a or the write-power setting table 14b and the external magnetic field strength setting table 14c and adds those offsets to defaults to set the read-power or the write-power and the external magnetic field strength (step S9-2).

In the third embodiment, the read-power or write-power offset and the external magnetic field strength offset are stored for each block. Thus, it is possible to reduce a data amount in the setting tables 14a, 14b and 14c.

In the first, second and third embodiments, offsets are stored in the read-power setting table 14a, the write-power setting table 14b and the external magnetic field strength setting tables 14c. But alternatively, actual read-powers or actual write-powers as is may be stored. Data that can be the read-power, the write-power or the external magnetic field strength by calculation may be stored.

In these embodiments, the setting tables 14a, 14b and 14c are developed in the buffer memory 20 in FIG. 6 when the setting tables 14a, 14b and 14c are used.

According to these embodiments, offsets are stored for the external magnetic field strengths. Thus, storing the offsets needs relatively smaller storage area than storing actual external magnetic field strengths.

Moreover, according to these embodiments, the test pattern is written and then the external magnetic field strengths are determined based on the result of reading the written test pattern. Thus, it is possible to control the external magnetic field strength based on a condition of the recording medium inserted and then it is possible to record information in a preferable condition.

Further more, in these embodiments, each time the recording medium is inserted, these setting processes are executed to set all offsets. The offsets are for each recording medium. Thus, the external magnetic field strength can be preferably controlled based on each recording medium condition and it is possible to record information in a preferable condition.

In addition, in these embodiments, the offsets are set again at predetermined intervals after the recording medium is loaded. Thus, after the recording medium is loaded, when a loading state of the recording medium to a rotation axis is changed, the offsets are set again at predetermined intervals. Accordingly, the external magnetic field strength is always adjusted to the recording medium condition and then it is possible to record information in a preferable condition.

Moreover, in these embodiments, the external magnetic field strength is controlled to apply to the recording medium when information recorded in the recording medium is read out. Thus, it is possible to properly read out information recorded in the recording medium by the optimum external magnetic field strength and it is possible to reduce occurrences of a read error.

Furthermore, in these embodiments, the external magnetic field strength is controlled to apply to the recording medium when information is recorded in the recording medium. Thus, it is possible to properly record information in the recording medium by the optimum external magnetic field strength.

In addition, in these embodiments, offsets are stored for the laser beam powers. Thus, storing the offsets needs relatively smaller storage area than storing actual laser beam powers.

Moreover, in these embodiments, the test pattern is written and then the laser powers are determined based on the result of reading the written test pattern. Thus, it is possible to control the laser powers based on a condition of the recording medium inserted and then it is possible to record information in a preferable condition.

Furthermore, in these embodiments, each time the recording medium is inserted, these setting processes are executed to set all offsets. The offsets are for each recording medium. Thus, the laser powers can be preferably controlled based on each recording medium condition and it is possible to record information in a preferable condition.

In addition, in these embodiments, the offsets are set again at predetermined intervals after the recording medium is loaded. Thus, after the recording medium is loaded, when a loading state of the recording medium to a rotation axis is changed, the offsets are set again at predetermined intervals. Accordingly, the laser power is always adjusted to the recording medium condition and then it is possible to record information in a preferable condition.

Moreover, a laser beam, which is emitted by a laser beam emitting part, is controlled when information is read out from the recording medium. Thus, it is possible to read out information by the optimum external magnetic field strength and the optimum laser power and it is possible to reduce occurrence of read error.

Also, a laser beam, which is emitted by a laser beam emitting part, is controlled when information is recorded to the recording medium. Thus, it is possible to record information by the optimum external magnetic field strength and the optimum laser power.

Furthermore, it is possible to predict defaults, which are to be occurred on a disk surface of the recording medium, by predetermined optimum external magnetic field strength. Therefore, it is possible to detect the defaults before information is recorded. Accordingly, it is possible to improve maintenance and reliability of recorded information.

The present invention is not limited to the specifically disclosed embodiments, variations and modifications, and other variations and modifications may be made without departing from the scope of the present invention.

The present application is based on Japanese Priority Application No. 11-240501 filed Aug. 26, 1999, the entire contents of which are hereby incorporated by reference.

What is claimed is:

1. An information storage apparatus for emitting a light beam to a recording medium and recording information on the recording medium by applying an external magnetic field by an external magnetic field applying part to a position illuminated by the light beam, comprising:

an external magnetic field control part for controlling a strength of the external magnetic field which is applied on the recording medium by the external magnetic field applying part based on a strength of the magnetic field applied to each of a predetermined number of magnetic field sectors of a test track on the recording medium.

2. The information storage apparatus as claimed in claim 1, wherein said external magnetic field control part controls the external magnetic field strength for each of the magnetic field test sectors dividing a recording surface of the recording medium in a circumferential direction of the recording medium.

3. The information storage apparatus as claimed in claim 1, wherein said external magnetic field control part controls the external magnetic field strength for each of a plurality of data sectors of the recording medium based on the strength of the magnetic field applied to the magnetic field test sectors.

4. The information storage apparatus as claimed in claim 1, wherein said external magnetic field control part controls the external magnetic field strength for each of the magnetic field test sectors dividing a recording surface of the recording medium in a radial direction of the recording medium.

5. The information storage apparatus as claimed in claim 1, wherein said external magnetic field control part comprises a setting memory storing a determined value of the external magnetic field strength for each of a plurality of the magnetic field test sectors on the recording medium, reads out the determined value for each of the magnetic field test sectors corresponding to each of target sectors illuminated by the light beam from the setting memory, and controls the external magnetic field strength applied to the recording medium at the target sectors.

6. The information storage apparatus as claimed in claim 1, comprising:

a beam power control part controlling a light beam power strength of the light beam which is emitted on the recording medium by a light beam emitting part for each of a predetermined number of power control sectors of the recording medium.

7. The information storage apparatus as claimed in claim 6, said beam power control part controls the light beam power strength of the light beam for each of power control sectors of the recording medium.

8. The information storage apparatus as claimed in claim 6, wherein said beam power control part controls the light beam power strength of the light beam for each of the power control sectors in a radial direction of the recording medium.

9. The information storage apparatus as claimed in claim 6, wherein said beam power control part comprises a setting memory storing a determined value of the light beam power strength for each of the power control sectors on the recording medium, reads out the determined value for each of power control sectors corresponding to each of target sectors illuminated by the light beam from the setting memory, and controls the light beam power strength.

10. A method for emitting a light beam to a recording medium and recording information on the recording medium by applying an external magnetic field to an illuminated position by the light beam, comprising the step of:

controlling an external magnetic field strength which is applied on the recording medium by the external magnetic field applying part for each of a predetermined number of magnetic field test sectors of a test track on the recording medium.

11. The method as claimed in claim 10, comprising the step of:

controlling a light beam power strength of the light beam which is emitted on the recording medium by a light beam emitting part for each of a predetermined number of power control sectors on the recording medium.

* * * * *